US012785427B2

(12) United States Patent
Su et al.

(10) Patent No.: US 12,785,427 B2
(45) Date of Patent: Nov. 3, 2026

(54) PORTABLE ELECTRONIC CHARGING CASE WITH A COMPACT DESIGN AND ADVANCED FUNCTIONALITY

(71) Applicant: Plume Design, Inc., Palo Alto, CA (US)

(72) Inventors: Ming-Tsung Su, Taipei City (TW); Hao-Hsiu Huang, Taipei City (TW); Miroslav Samardzija, Mountain View, CA (US); Crystal Wai, Redwood City, CA (US); Shu Chun Shen, Taipei City (TW); Hsiangyin Cheng, Taipei City (TW); Richard Chang, Los Altos, CA (US); Liem Hieu Dinh Vo, San Jose, CA (US); Meng-Jung Chuang, Taipei City (TW)

(73) Assignee: PLUME DESIGN, INC., Palo Alto, CA (US)

( * ) Notice: Subject to any disclaimer, the term of this patent is extended or adjusted under 35 U.S.C. 154(b) by 949 days.

(21) Appl. No.: 18/147,551

(22) Filed: Dec. 28, 2022

(65) Prior Publication Data

US 2023/0134920 A1 May 4, 2023

Related U.S. Application Data

(63) Continuation-in-part of application No. 17/391,531, filed on Aug. 2, 2021, now Pat. No. 12,212,047.

(51) Int. Cl.
*H01M 10/46* (2006.01)
*H02J 7/42* (2026.01)
(Continued)

(52) U.S. Cl.
CPC ................ *H02J 7/731* (2026.01); *H02J 7/42* (2026.01); *H02J 50/20* (2016.02); *H04W 4/80* (2018.02); *H02J 2207/30* (2020.01)

(58) Field of Classification Search
CPC ...... H02J 7/0044; H02J 7/00034; H02J 50/23; H02J 50/20; H02J 50/005; H04W 4/80; H01Q 1/273; H01Q 7/06
(Continued)

(56) References Cited

U.S. PATENT DOCUMENTS 6,853,197 B1 2/2005 McFarland et al.
6,961,545 B2 11/2005 Tehrani et al.
(Continued)

FOREIGN PATENT DOCUMENTS

CN 106104408 B * 7/2021 ............. G06V 40/10
KR 20140106904 A * 9/2014 ......... G06F 3/03545

OTHER PUBLICATIONS

Machine translate of CN106104408B (Jul. 27, 2021) (Year: 2021).*
Nov. 22, 2022, International Search Report and Written Opinion for International Application No. PCT/US2022/038862.

*Primary Examiner* — Edward Tso
(74) *Attorney, Agent, or Firm* — Nicholas Martin; Greenberg Traurig, LLP

(57) ABSTRACT

A portable electronic charging case, with a compact form-factor, such as for a smart ring or the like, includes a base; a front cover connected to the base and configured to seal an interior of the charging case; a post on the base and in the interior; an antenna disposed within the post; and circuitry connected to the antenna and to a charging port located on the base. The electronic charging case includes advanced functionality, an aesthetic design, and a compact form-factor. The compact form-factor includes an embedded battery, an environmentally sealed design, and a small NFC/Bluetooth antenna. The aesthetic design includes no user-actuated mechanisms on an exterior of the charging case and an intelligent light sensor for illuminating the charging case. The advanced functionality includes the embedded battery, intelligent light sensor, a temperature
(Continued)

sensor for monitoring a user, and monitoring techniques working in conjunction with an associated wearable device.

19 Claims, 21 Drawing Sheets

(51) Int. Cl.
*H02J 7/70* (2026.01)
*H02J 50/20* (2016.01)
*H04W 4/80* (2018.01)

(58) Field of Classification Search
USPC ................. 320/107, 108, 114, 115, 132, 150
See application file for complete search history.

(56) References Cited

U.S. PATENT DOCUMENTS

| | | | |
|---|---|---|---|
| 7,245,882 B1 | 7/2007 | McFarland | |
| 7,245,893 B1 | 7/2007 | Husted et al. | |
| 7,251,459 B2 | 7/2007 | McFarland et al. | |
| 9,136,937 B1 | 9/2015 | Cheng et al. | |
| 9,160,584 B1 | 10/2015 | Kavousian et al. | |
| 9,769,558 B2 * | 9/2017 | Chandramohan ...... | H04R 5/033 |
| 10,855,335 B1 | 12/2020 | Napoles et al. | |
| 11,026,177 B1 | 6/2021 | Chung | |
| 11,419,546 B2 | 8/2022 | Cihan et al. | |
| 2013/0090057 A1 | 4/2013 | Green et al. | |
| 2013/0293424 A1 | 11/2013 | Zhu et al. | |
| 2014/0009344 A1 | 1/2014 | Zhu et al. | |
| 2014/0009355 A1 | 1/2014 | Samardzija et al. | |
| 2014/0112511 A1 | 4/2014 | Corbin et al. | |
| 2014/0226572 A1 | 8/2014 | Thota et al. | |
| 2014/0340265 A1 | 11/2014 | Vazquez et al. | |
| 2015/0099474 A1 | 4/2015 | Yarga et al. | |
| 2015/0109167 A1 | 4/2015 | Yarga et al. | |
| 2015/0195836 A1 | 7/2015 | Malkin et al. | |
| 2015/0302976 A1 | 10/2015 | Chang et al. | |
| 2015/0303568 A1 | 10/2015 | Yarga et al. | |
| 2015/0311960 A1 | 10/2015 | Samardzija et al. | |
| 2016/0056526 A1 | 2/2016 | Li et al. | |
| 2016/0181851 A1 * | 6/2016 | Porat ....................... | H02J 50/10<br>320/108 |
| 2016/0336643 A1 | 11/2016 | Pascolini et al. | |
| 2020/0077954 A1 | 3/2020 | Bossetti et al. | |
| 2020/0077955 A1 | 3/2020 | Shui et al. | |
| 2020/0233452 A1 | 7/2020 | von Badinski et al. | |
| 2021/0274273 A1 | 9/2021 | Chawan et al. | |
| 2023/0036419 A1 * | 2/2023 | Giffen ................... | H02J 50/005 |

* cited by examiner

PORTABLE ELECTRONIC CHARGING CASE WITH A COMPACT DESIGN AND ADVANCED FUNCTIONALITY

CROSS-REFERENCE TO RELATED APPLICATIONS

The present disclosure is a continuation-in-part of U.S. patent application Ser. No. 17/391,531, filed Aug. 2, 2021, and entitled "Automatically reconfigurable antenna circuit for enabling operation within multiple frequency bands," the contents of which are incorporated by reference in their entirety.

FIELD OF THE DISCLOSURE

The present disclosure relates generally to a charging case. More particularly, the present disclosure relates to a portable electronic charging case, with a compact form-factor, such as for a smart ring or the like.

BACKGROUND OF THE DISCLOSURE

With the miniaturization of electronic devices over the years, various types of relatively small, wearable devices (e.g., smart rings, watches, wrist bands, earbuds, headphones, emergency alert devices, health monitoring devices, etc.) have been introduced. Such devices typically require an external charging device or case. There is a need to provide advanced functionality, aesthetic design, and compact form-factor for such charging cases. For the compact form-factor, there is a need in the charging case to support a multi-function antenna, such as a Near-Field Communication (NFC) charger configured to create a magnetic field for charging the battery, and a Bluetooth antenna for pairing and communication. With small electronic devices, e.g., smart rings, earbuds, etc., the antenna design is complicated to fit within a small form-factor. For the aesthetic design, the presence of buttons, switches, and other user-actuated mechanisms on a charging case may lack a certain aesthetic quality, and there are currently very few options for hiding these user-actuated mechanisms. Therefore, there is need to provide a more aesthetic solution for incorporating mechanisms to receive user input. Also, from a mechanical perspective, surface-mounted user-actuated mechanisms may suffer from the fact that they might not be completely waterproof or sealed against the environment, which can lead to problems with internal electrical circuitry. Also, conventional user-actuated mechanisms on small wearable devices may be difficult to move (e.g., depress, slide, toggle, etc.) and at times can be accidentally actuated. Also, it can be difficult at times to press or slide certain mechanisms adequately.

BRIEF SUMMARY OF THE DISCLOSURE

The present disclosure relates to a portable electronic charging case, with a compact form-factor, such as for a smart ring or the like. The electronic charging case includes advanced functionality, an aesthetic design, and a compact form-factor. The compact form-factor includes an embedded battery, an environmentally sealed design, and a small NFC/Bluetooth antenna. The aesthetic design includes no user-actuated mechanisms on an exterior of the charging case and an intelligent light sensor for illuminating the charging case. The advanced functionality includes the embedded battery, intelligent light sensor, a temperature sensor for monitoring a user, and monitoring techniques working in conjunction with an associated wearable device. Those skilled in the art will appreciate the changing case described herein can include one of more of the aforementioned features as well as combinations thereof.

In an embodiment, a charging case includes a base; a front cover connected to the base and configured to seal an interior of the charging case; a post on the base and in the interior, wherein the base is dimensioned to receive a wearable device; an antenna disposed within the post; and circuitry connected to the antenna and to a charging port located on the base. The antenna can support both Near Field Communication (NFC) for charging the wearable device and Bluetooth (e.g., Bluetooth™ and Bluetooth Low Energy (BLE), for example) for communicating with the wearable device. The antenna can support NFC for charging the wearable device. The wearable device can be a smart ring. The charging case can further include a wedge disposed between the smart ring and a wall facing the post, wherein the wedge is dimensioned based on a size of the smart ring. The post can be at an angle on the base, with the angle directed towards the front cover when open.

The base and the front cover can exclude any user-actuated mechanisms include a button, a switch, and a touch display. The wearable device can be configured to pair with the charging case based on any of detected motion of the wearable device, tapping of the wearable device, and tapping of the charging case. The charging port can utilize Universal Serial Bus (USB). The charging case can further include an embedded battery in the base, connected to the circuitry and the charging port. The charging case can further include a light pipe on the base and connected to a light emitting diode (LED) on the circuitry. The charging case can further include a light sensor in the circuitry, wherein the light sensor is configured to monitor light in a room where the charging case is located. The circuitry can be configured to illuminate the LED based on light in a room where the charging case is located. The charging case can further include an ambient temperature sensor in the circuitry. The circuitry can be configured to monitor ambient temperature in a room where the charging case is located, and utilize the monitored ambient temperature for one of a plurality of functions. The plurality of functions can include monitoring for falls with the wearable device, monitoring sleep of a user wearing the wearable device, and monitoring body temperature of the user.

The charging case can further include an ambient temperature sensor in the circuitry; a light pipe on the base and connected to a light emitting diode (LED) on the circuitry; and a light sensor in the circuitry, wherein the light sensor is configured to monitor light in a room where the charging case is located. The circuitry can be configured to provide data from any of the ambient temperature sensor and the light sensor for correlation with data from the wearable device. The charging case can further include a seal between the front cover and the base for environmentally sealing the interior. The charging case can further include a rubber boot configured over the post, wherein the rubber boot is dimensioned based on a size of the wearable device.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, the present disclosure relates to a portable electronic charging case, with a compact form-factor, such as for a smart ring or the like. The electronic charging case includes advanced functionality, an aesthetic design, and a compact form-factor. The compact form-factor includes an embedded battery, an environmentally sealed design, and a small NFC/Bluetooth antenna. The aesthetic design includes no user-actuated mechanisms on an exterior of the charging case and an intelligent light sensor for illuminating the charging case. The advanced functionality includes the embedded battery, intelligent light sensor, a temperature sensor for monitoring a user, and monitoring techniques working in conjunction with an associated wearable device. Those skilled in the art will appreciate the changing case described herein can include one of more of the aforementioned features as well as combinations thereof.

In various embodiments described herein, the charging case is described for charging a smart ring. Those skilled in the art will appreciate the charging case can be adapted for any compact user-wearable devices, such as, without limitation, rings, earbuds, heart monitors, emergency alert systems, smart watches, smart bracelets, and the like.

Compact Antenna for the Charging Case

Figure 1:
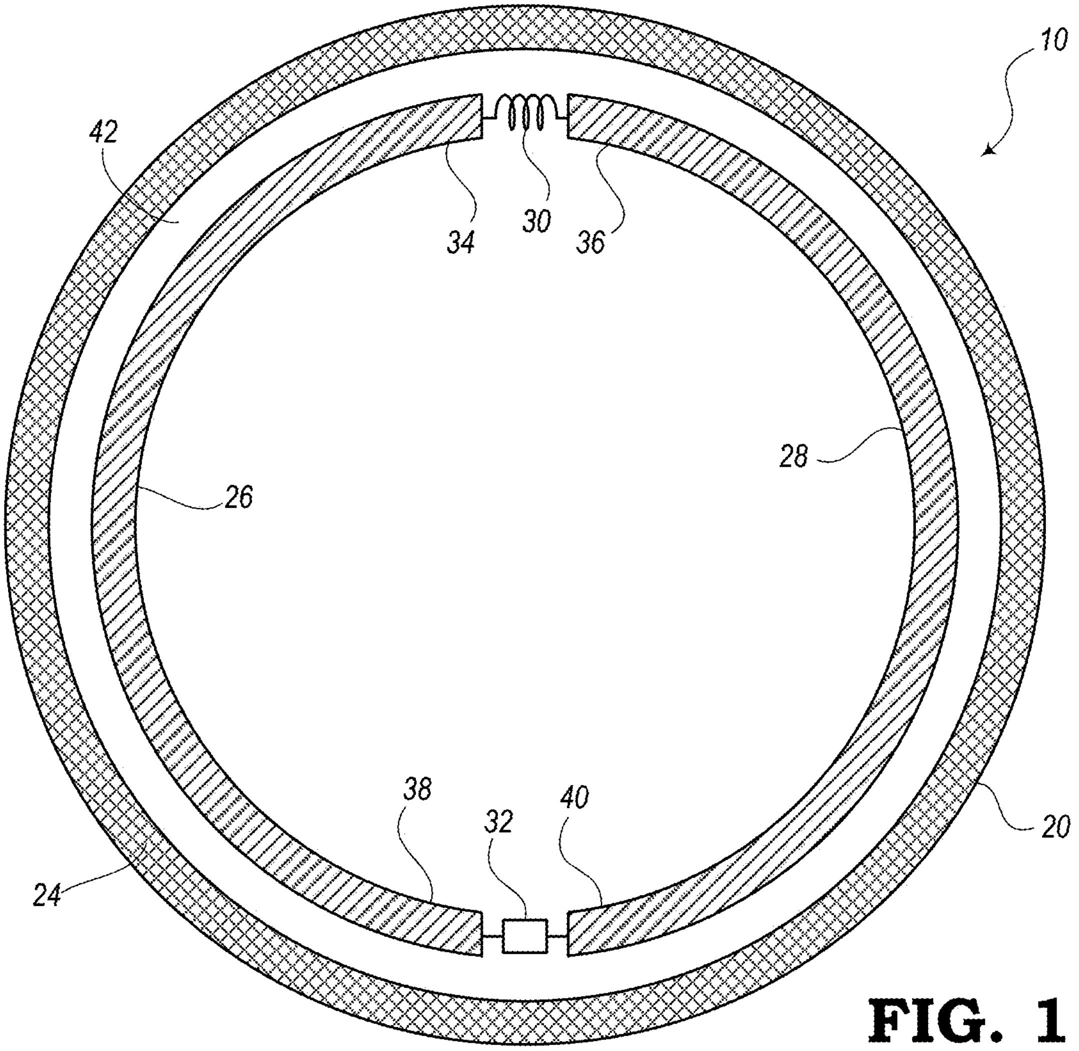
FIG. 1 is a cross-sectional diagram of an antenna for use in a charging case, such as for a smart ring.

FIG. 1 is a cross-sectional diagram of an antenna 10 for use in a charging case, such as for a smart ring. The smart ring described herein can wirelessly communicate at short range to various devices. For example, the smart ring may be worn on a finger of a user (e.g., customer). When positioned near a mobile device, the smart ring and a mobile device may be configured to operate within a first frequency band (e.g., Bluetooth frequencies) to enable communication therebetween. When positioned close to a Point-of-Sale (POS) machine, the smart ring and POS machine may be configured to operate within a second frequency band (e.g., Near Field Communication (NFC) frequencies) to enable communication therebetween.

Conventional smart rings normally do not allow operation within two separate frequency bands. However, according to the various embodiments of the present disclosure, various antenna components of the smart ring include specific physical characteristics and electrical circuitry that enable operation at two different frequency band. This allows the smart ring to pair with the mobile device to enable operation within the first frequency band (e.g., Bluetooth) while also allowing the smart ring to pair with the POS machine to enable operation within the second frequency band (e.g., NFC). In particular, antenna portions, as described below, may be configured to be fully embedded in a normal-sized ring, as well as, in some embodiments, in a post 104 in a charging case 100. These antenna portions may include, for example, the electrically conductive battery casing and also a conductive trace or film on a Flexible Printed Circuit (FPC) or other suitable flexible board that can be embedded within the normal-sized ring and/or the post 104 in the charging case 100. By using these components, which may already be needed for wireless communication, it may be possible to minimize the extra number of parts and circuitry to conserve space within the outer shell of the smart ring.

The antenna 10 shown in FIG. 1 can be used on both the smart ring and the charging case. Functionally, for the charging case, the antenna 10 can be used with NFC for wireless charging and with Bluetooth for pairing and data communication. The following describes the antenna 10 with respect to its use in the charging case. The antenna 10 includes an outer surface 20 that is configured to receive the smart ring. The outer surface can be a material configured to receive the smart ring and that is conductive. Of note, according to some embodiments, the antenna 10 can support both NFC and/or Bluetooth (in additional to any other type of known or to be known short-range communication/pairing technologies, for example), as well as just NFC. For NFC, some embodiments may refer to the antenna 10 as a charging coil.

The antenna 10 includes a first antenna component 26 and a second antenna component 28. The first and second antenna components 26, 28, in combination, may form a ring or tube having a relatively narrow width (e.g., measured from an outer surface to an inner surface as shown in FIG. 1) and a relatively narrow depth (e.g., measured into the page). In some embodiments, the depth of each of the first and second antenna components 26, 28 may have a dimension that is greater than its width.

Furthermore, the antenna 10 includes a first electrical circuit 30 and a second electrical circuit 32. The first electrical circuit 30 is configured to electrically connect a first end portion 34 of the first antenna component 26 with a first end portion 36 of the second antenna component 28. Also, the second electrical circuit 32 is configured to electrically connect a second end portion 38 of the first antenna component 26 with a second end portion 40 of the second antenna component 28.

Figure 2:
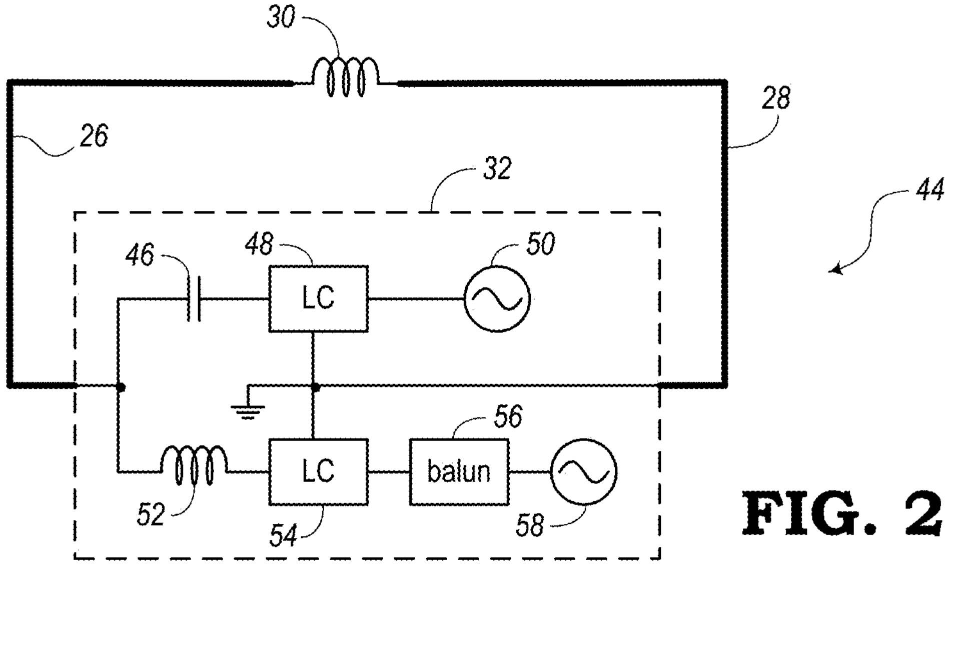
FIG. 2 is a schematic diagram illustrating an embodiment of an antenna circuit.

FIG. 2 is a schematic diagram illustrating an embodiment of an antenna circuit 44. In this embodiment, the antenna circuit 44 includes the first electrical circuit 30, the second electrical circuit 32, and the first and second antenna components 26, 28 connected between the first and second electrical circuits 30, 32. According to some embodiments, the first electrical circuit 30 may simply include an inductor configured to act like an open circuit at higher frequencies (e.g., Bluetooth frequencies) and act like a short circuit at lower frequencies (e.g., NFC frequencies).

As shown in the embodiment of FIG. 2, the second electrical circuit 32 includes a first set of components 46, 48, 50 configured for operation at the higher frequency range (e.g., Bluetooth) and a second set of components 52, 54, 56, 58 configured for operation at the lower frequency range (e.g., NFC). The first set of components includes a frequency blocking device 46 (e.g., series-connected capacitor), a higher-frequency matching circuit 48 (e.g., a combination of series-connected and shunt-connected inductors and capacitors), and a higher-frequency radio transceiver 50. The second set of components includes a higher-frequency choke or choke inductor 52 (e.g., a series-connected inductor or ferrite bead), a lower-frequency matching circuit (e.g., combination of series-connected and shunt-connected capacitors), a lower-frequency balun 56, and a lower-frequency radio transceiver 58. The matching circuits 48, 54 may be connected to ground and the radio transceivers 50, 58 may also be connected to ground.

To design an efficient antenna according to antenna theory, the length of the antenna is typically one fourth, one half, or one whole wavelength of the frequency of operation. For example, at a Bluetooth or Wi-Fi frequency of about 2.4 GHz, the wavelength is about 120 mm. At an NFC frequency of about 13.56 MHz, the wavelength is about 22 m (i.e., 22,000 mm). Other similar wavelengths may be applicable at other Bluetooth frequencies (e.g., about 2.4000 GHz to about 2.4835 GHz) or at other NFC frequencies (e.g., about 12.66 MHz to about 14.46 MHz).

Rings typically vary in diameter from about 12 mm to about 22 mm and typically vary in internal circumference from about 49 mm to about 72 mm. Even the largest ring sizes are well below the typically minimum required diameter dimension of one-fourth of the wavelength (i.e., 120 mm/4=30 mm at Bluetooth frequency). Even if the entire ring is used for antenna volume it still would not be enough. This does not even include all the other parts, like battery, photo diode sensors, RF board, chips, etc.

Typical designs on the market use chip antennas that are a few mm by a few mm in size, but which require dedicated antenna volume that is already scarce. In addition, chip antennas have low performance as they typically rely on PCB ground currents that are weak in ring size (e.g., due to the small size of the PCB itself). Nevertheless, the configuration of the first and second antenna components 26, 28 as described with respect to the embodiments of the present disclosure allows the circumference dimension to be utilized in a specific way to enable operation in both frequency bands. Operation is contemplated in both frequency bands simultaneously. For example, the NFC band could be used for charging while the Bluetooth band is used for accessing another Bluetooth device, e.g., the smart ring. Another example can include using the ring for payment (NFC) while maintaining a connection to a phone (Bluetooth).

Therefore, according to various implementations of the present disclosure, antenna systems and antenna circuits are provided. In one example, an antenna system may include the first antenna component 26 having a first end portion 34 and a second end portion 38 and the second antenna component 28 having a first end portion 36 and a second end 40. The antenna system may also include the first electrical circuit 30 connecting the first end portion 34 of the first antenna component 26 with the first end portion 36 of the second antenna component 28 and a second electrical circuit 32 connecting the second end portion 38 of the first antenna component 26 with the second end portion 40 of the second antenna component 28. In response to the first and second electrical circuits 30, 32 being configured in a first state, the first antenna component 26 and second antenna component 28 are configured to operate within a first frequency band (e.g., Bluetooth). In response to the first and second electrical circuits 30, 32 being configured in a second state, the first antenna component 26 and second antenna component 28 are configured to operate within a second frequency band (e.g., NFC).

Also, in response to the first and second electrical circuits 30, 32 being configured in the first state, the first antenna component 26 and second antenna component 28 are configured in a dipole antenna arrangement (e.g., when the inductor 30 acts as an open circuit). In response to the first and second electrical circuits 30, 32 being configured in the second state, the first antenna component 26 and second antenna component 28 are configured in a loop antenna arrangement (e.g., when the inductor 30 acts as a short circuit). According to some embodiments, the antenna system may be incorporated in a wearable device, such as a smart ring which may be worn on a finger of the wearer. The antenna 10 may include an outer shell having characteristics configured for parasitic reflection of transmission signals.

According to some embodiments, operation within the first frequency band may enable pairing with a smart ring and operation within the second frequency band enable charging. The antenna system may further include a battery configured to power one or more of the first and second electrical circuits 26, 28. The battery may include an outer metal casing that forms at least a portion of the first antenna component 26. The antenna system may also include a Near-Field Communication (NFC) charger. The NFC charger may be configured to create a magnetic field for charging the battery of the smart ring. The first frequency band may include one or more channels in a Bluetooth frequency band ranging from about 2.4000 GHz to about 2.4835 GHz and the second frequency band may include one or more channels in a Near-Field Communication (NFC) frequency band ranging from about 12.66 MHz to about 14.46 MHz.

The second antenna component 28 may include at least a Flexible Printed Circuit (FPC) or FPC board on which at least a portion of the second electrical circuit 28 resides. The first electrical circuit 30 may include a choke inductor that behaves like an open circuit when operating within the first frequency band and behaves like a short circuit when operating within the second frequency band. The second electrical circuit 32 may include blocking elements 46, 52, matching circuit elements 48, 54, and transceiver elements 50, 58 to enable operation within either the first frequency band or second frequency band. Also, according to embodiments described with respect to FIGS. 3 and 4, the antenna system may further include one or more conductive strips and/or one or more ferrite strips attached to one or more of the first and second antenna components 26, 28.

In operation, the antenna 10 uses the metal jacket or casing on the battery as part of the first antenna component 26 and can therefore serve as one of the arms of a dipole-like antenna, radiator, or transceiver. When the first electrical circuit 30 is shorted, the battery casing can serve as part of a current path for a loop antenna including both antenna components 26, 28. The battery can also serve as the ground plane of the antenna. In some embodiments, a thin metallic film (e.g., copper tape) can be installed along an outside surface of the battery (e.g., as described below with respect to FIGS. 3 and 4).

Figure 3:
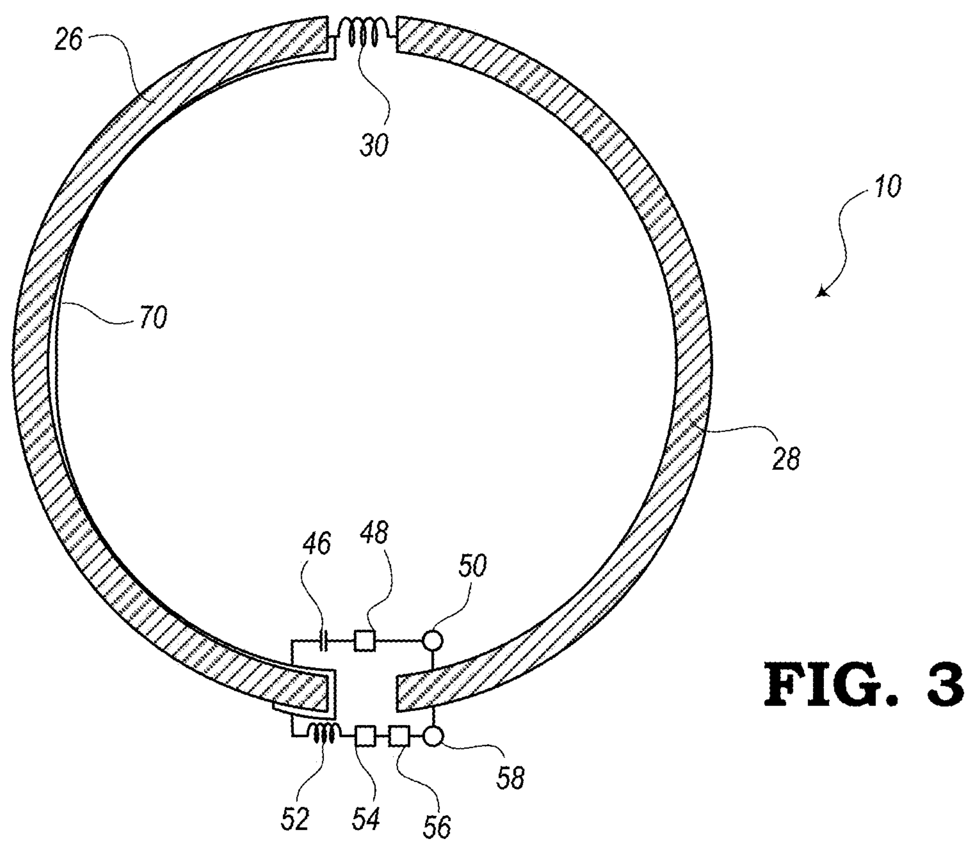
FIG. 3 is a diagram illustrating the antenna of FIG. 1 with a strip of conductor film formed on one surface of a battery casing, according to various embodiments.

FIG. 3 is a diagram illustrating an embodiment of the antenna 10, which may further include a strip of conductor film 70 formed on one surface (e.g., inner surface) of the first antenna component 26 (e.g., battery casing). In this embodiment, the battery jacket may be at least partially conductive and the conductor film 70 may be used as a conductor for providing more predictable antenna properties, such as improving conductivity, reducing resistance, etc. Also, the conductor film 70 may be added over the first antenna component 26 from the first electrical circuit 30 to the high frequency choke inductor element 52.

Figure 4:
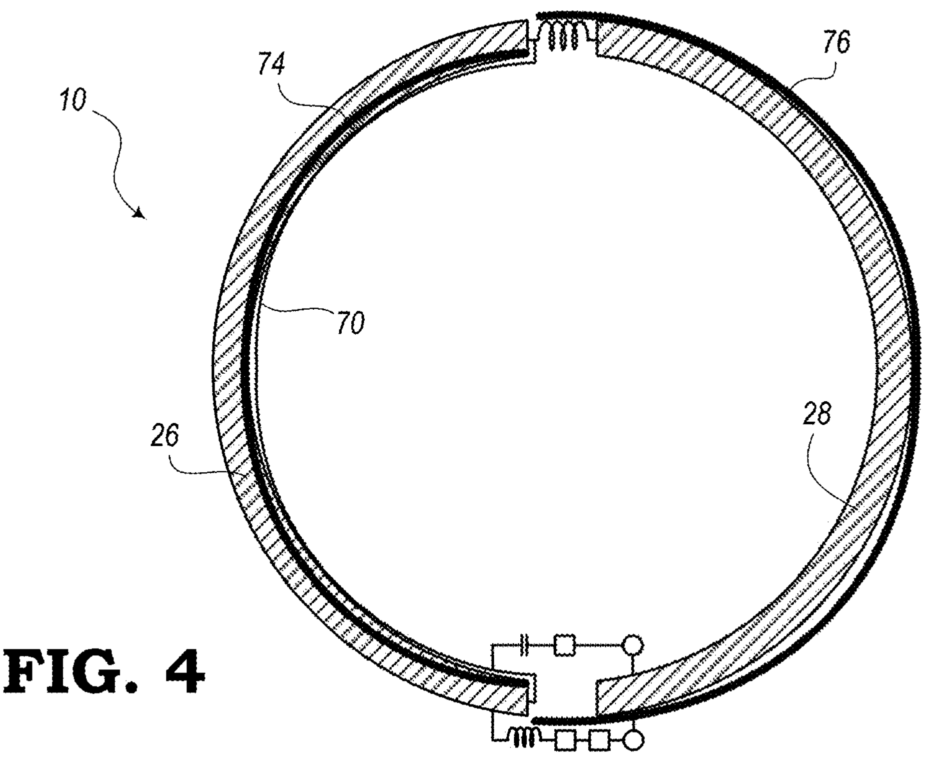
FIG. 4 is a diagram illustrating the antenna of FIG. 1 with the strip of conductor film of FIG. 3 and strips of ferrite sheets formed on surfaces of the battery casing and a Flexible Printed Circuit (FPC), according to various embodiments.

FIG. 4 is a diagram illustrating another embodiment of the antenna 10, which may further include first and second strips of ferrite sheets 74, 76, in addition to the strip of conductor film 70 shown in FIG. 3. The first strip of ferrite sheet 74 may be formed on a surface (e.g., inner surface) of the first antenna component 26 (e.g., battery casing), which may then be surrounded by the conductor film 70 in some embodiments. The second strip of ferrite sheet 76 may be formed on a surface (e.g., an outer surface) of the second antenna component 28 (e.g., FPC), such as between the metallic layer 24 and the FPC. If NFC antenna efficacy needs to be increased, one or more of the ferrite sheets 74, 76 can be placed on one or more of the first and second antenna components 26, 28.

The antenna 10 may include, at least partially, one or more traces on the FPC board or PCB (i.e., flexible or rigid boards). Other parts of the antenna 10 may include, at least partially, the metallization on the outside of the battery (e.g., battery case). A ground plane of the FPC may be the actual radiating element of the antenna, (e.g., no separate trace for the antenna element). Various techniques may be applied to protect the electronics from potentials that might be induced in the ground plane, disrupting their operation.

For the higher-frequency (Bluetooth) operation, the antenna 10 has a dipole arrangement, but for the lower-frequency (NFC) operation, the antenna 10 has a loop arrangement. The dipole can approximate a half wave dipole considering loading and tuning. The creation of either the dipole or loop arrangement can be determined by the state of the choke inductor 30. Also, the choke inductor 30 enables the antenna circuit to include higher-frequency or lower-frequency arrangements that can be tuned independently.

A metallic layer 24 of the antenna 10 can be a parasitic element with a predetermined thickness. Also, the antenna 10 may include a gap 42 between the metallic layer 24 and the first and second antenna components 26, 28. The gap 42 may have a predetermined width that can be designed to control the parasitic characteristics of the metallic layer 24.

The second electrical circuit 32 may include the capacitor 46 configured for isolation to protect the higher frequencies from the lower frequencies. Also, isolation by the inductor 52 can protect the lower frequency (NFC) circuits from the higher frequency signals.

Figure 5:
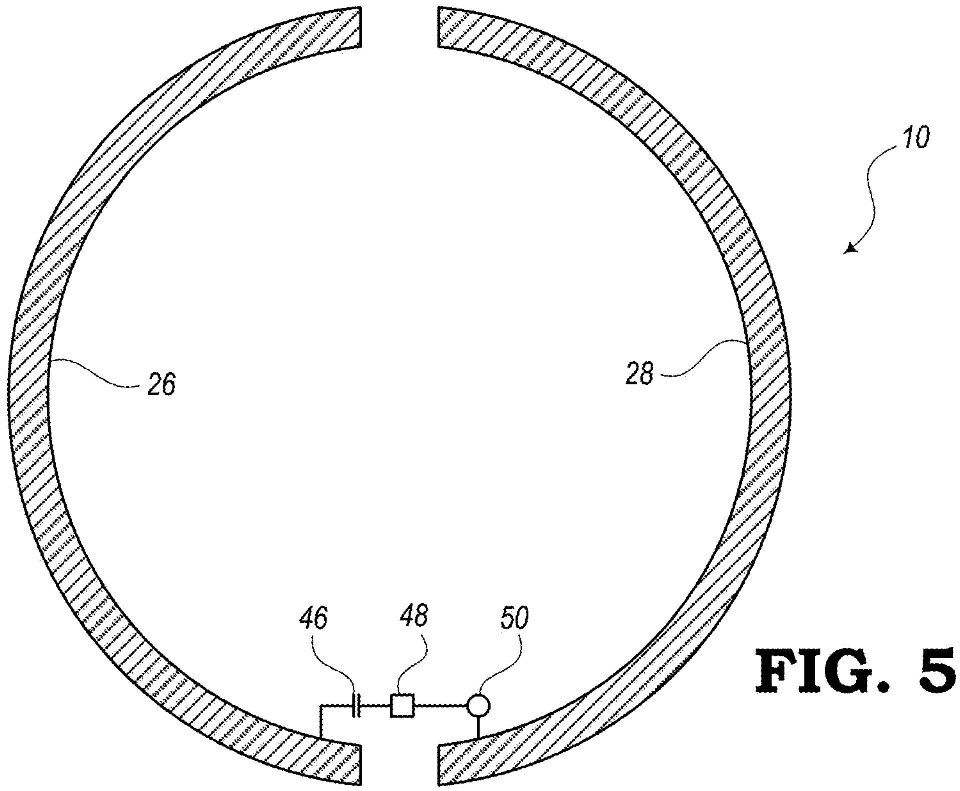
FIG. 5 is a diagram illustrating operation of the antenna of FIG. 1 within a first frequency band, according to various embodiments.

FIG. 5 is a diagram illustrating operation of the antenna 10 within a first (higher) frequency band, according to some embodiments. In the higher frequency operation (e.g., frequency band of about 2.0 GHz to about 2.4 GHz), the choke inductors 30, 52 are "open." As a result, the antenna circuitry (e.g., first and second antenna components 26, 28) effectively become a folded dipole device where a first arm includes the first antenna component 26 and a second arm includes the second antenna component 28. Also, the bottom portion of the second electrical circuit 32, which includes the components 52, 54, 56, 58, are essentially isolated as a result of the inductor 52 acting as an open circuit. Again, the first antenna component 26 may include the battery and/or battery casing and the second antenna component 28 may include the FPC, surrounded by the parasitic element (e.g., metallic layer 24, not shown in FIG. 5).

In the arrangement of FIG. 5, the antenna 10 is configured for higher frequency (e.g., Bluetooth) operation. Accordingly, the applicable wavelengths (e.g., carrier frequency wavelengths) may be about 120 mm at a frequency of about 2.4 GHz. The ring circumference may typically be about 50-70 mm, which is in neighborhood of a half wavelength. The battery casing and FPC can be about 25-35 mm long, which is in the neighborhood of a quarter wavelength. High frequency matching and chokes can be used to offset for embodiments in which the dipole arms are not exactly a quarter wavelength. At high frequency, the chokes are "open," and a folded dipole antenna structure is created.

Figure 6:
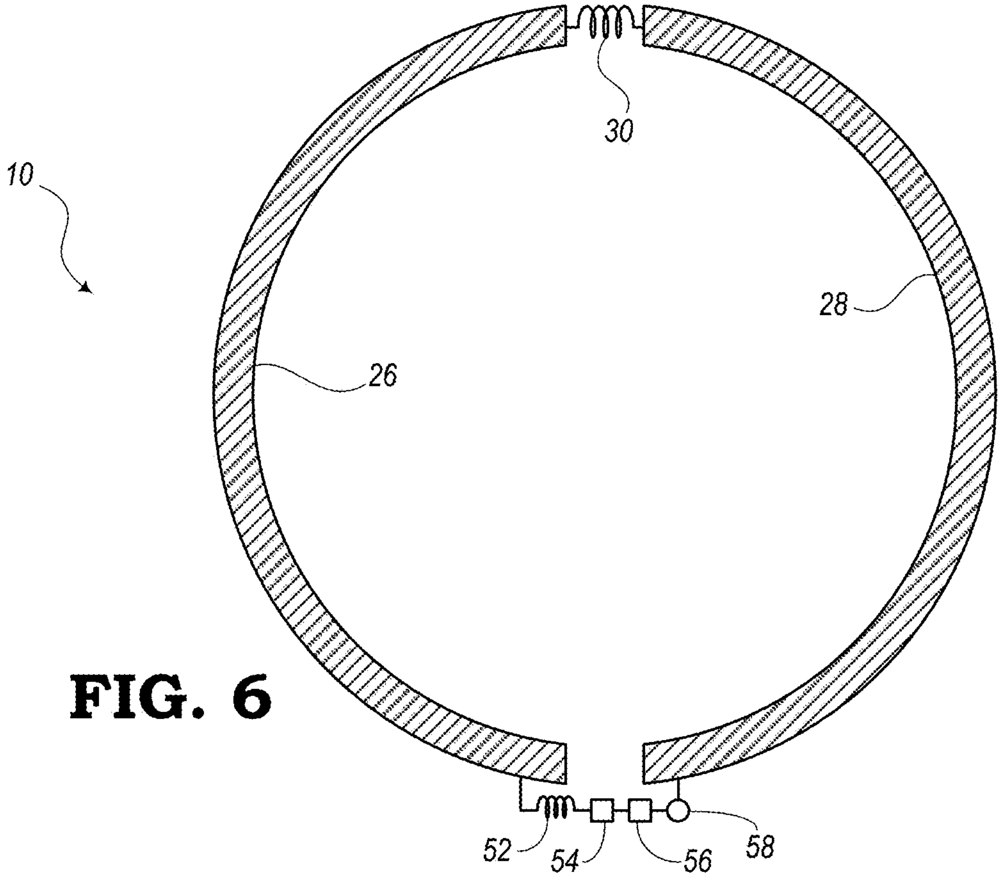
FIG. 6 is a diagram illustrating operation of the antenna of FIG. 1 within a second frequency band, according to various embodiments.

FIG. 6 is a diagram illustrating operation of the antenna 10 within the second (lower) frequency band. In the lower frequency band (e.g., NFC, about 13.56 MHz), the capacitor 46 (e.g., NFC blocker) is "open" and the antenna circuit effectively becomes a loop antenna made up of the battery or battery casing (e.g., first antenna component 26) and the FPC (e.g., second antenna component 28). Also, the inductor 30 may act essentially like a short circuit at the lower frequencies. The loop antenna is surrounded by parasitic element (e.g., metallic layer 24, not shown in FIG. 6).

Figure 7:
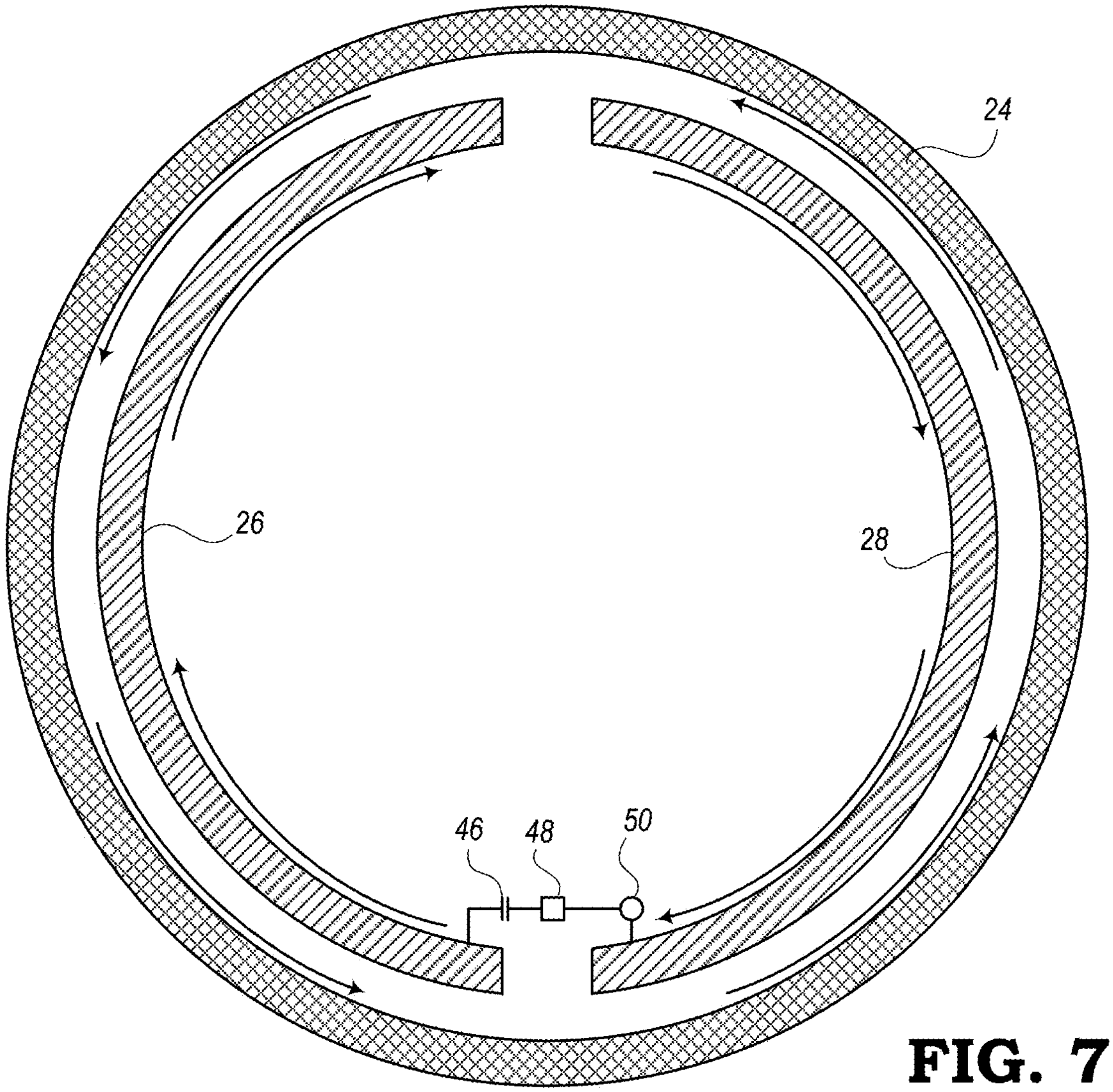
FIG. 7 is a diagram illustrating currents in a dipole antenna arrangement with parasitic currents, according to various embodiments.
Figure 8:
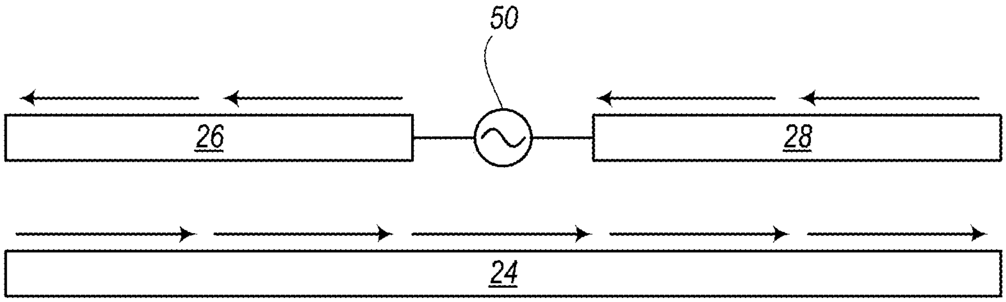
FIG. 8 is a diagram illustrating currents in the dipole antenna arrangement shown in FIG. 7 with the antenna elements laid out linearly, according to various embodiments.

FIG. 7 is a diagram illustrating currents in the dipole antenna arrangement as shown in FIG. 5. Also, parasitic currents through the metallic layer 24 are shown. FIG. 8 is a diagram illustrating currents in the dipole antenna arrangement, where the antenna elements are laid out linearly.

Figure 9:
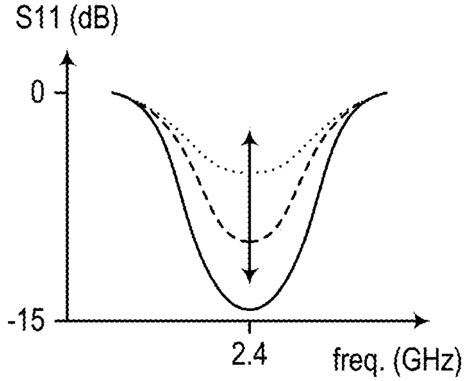
FIG. 9 is a graph illustrating the scattering parameter (S parameter) of S11 versus frequency of a matching circuit for use in the higher frequency band, according to various embodiments.
Figure 10:
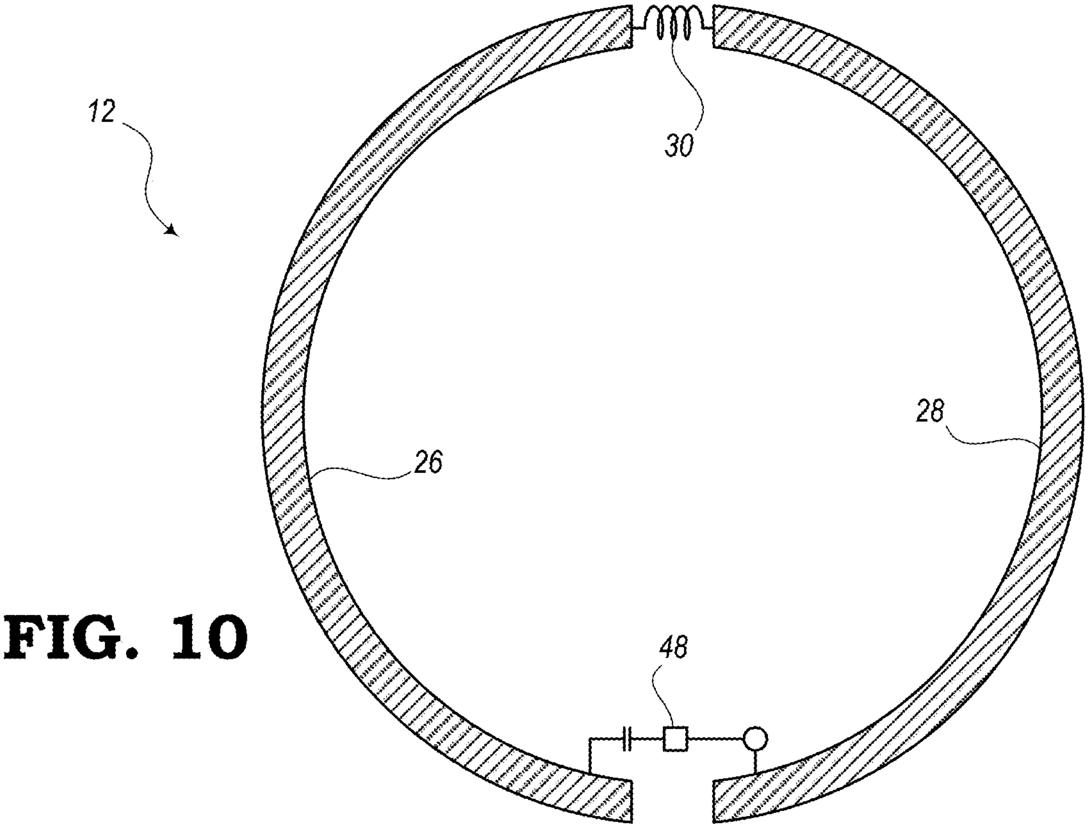
FIG. 10 is a diagram illustrating operation of the antenna of FIG. 1, according to various embodiments.
Figure 11:
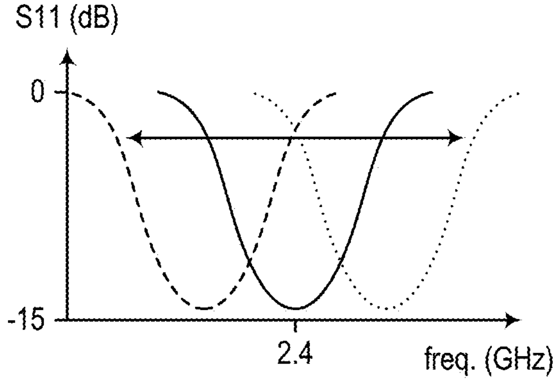
FIG. 11 is a graph illustrating the S parameter S11 versus frequency of a choke inductor for use in the higher frequency band, according to various embodiments.

FIG. 9 is a graph illustrating the scattering parameter (S parameter) of S11 versus frequency of the matching circuit 48, as shown in 10, for use in the higher frequency band. Inductance may be on the order of nH and capacitance may be on the order of pF. The term S11 may represent the input port voltage reflection coefficient of the scattering parameter matrix. FIG. 11 is a graph illustrating the S parameter S11 versus frequency of a choke inductor (e.g., inductor 30) for use in the higher frequency band. The inductor 30 may include an inductance on the order of uH. For the matching circuit 48, the inductance may be on the order of nH and the capacitors may have a capacitance on the order of pF.

Figure 12:
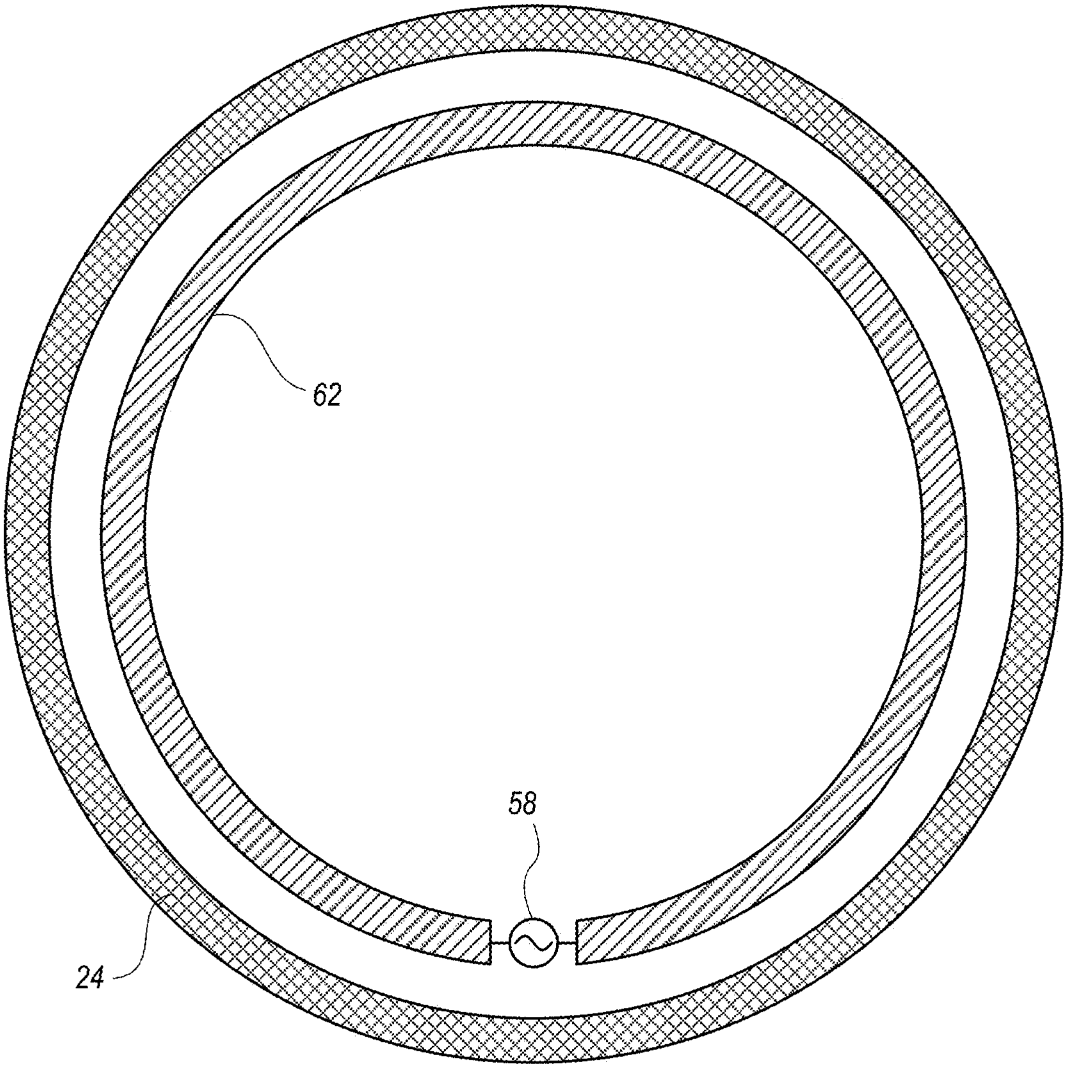
FIG. 12 is a diagram illustrating operation of the antenna of FIG. 1 for operation in the second frequency band, according to various embodiments

FIG. 12 is a diagram illustrating operation of the antenna 10 for operation in the second (lower) frequency band when configured as a loop antenna 62. The lower (NFC) band allows the antenna 10 to operate at about 13.56 MHz, plus or minus about 0.9 MHz and utilizing the transceiver 58. In the NFC band, the wavelength is about 22 m (i.e., 22,000 mm). The battery (e.g., first antenna component 26) and the FPC (e.g., second antenna component 28) are effectively connected through the higher frequency choke (e.g., inductor 30) at about 13.56 MHz. The lower frequency antenna may have low resistance and high inductance in the loop (e.g., about 0.1 to about 3.0 micro Henries (pH)). The other higher frequency choke (e.g., inductor 52) in addition to the inductor 30 can also be used to offset a lack of inductance in the loop 62.

Figure 13:
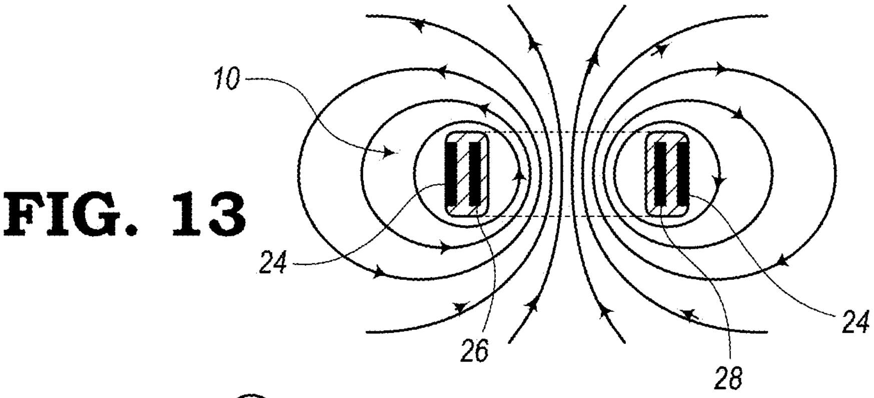
FIG. 13 is a diagram illustrating a side cross-sectional view of the antenna of FIG. 1 and corresponding magnetic field lines, according to various embodiments.

FIG. 13 is a cross-sectional view of the antenna 10 from a side perspective, where the antenna 10 extends orthogonally with respect to the page. In this embodiment, the metallic layer 24 is shown only at an outer portion of the antenna 10, but, in other embodiments, the metallic layer 24 may extend around the entire periphery of the ring surface or partially around the periphery. FIG. 13 also shows a cross section of the first antenna component 26 (e.g., battery casing) and a cross section of the second antenna component 28 (e.g., FPC). Although the cross section of the first and second antenna components 26, 28 are shown as being rectangular, it should be understood that they may include any suitable shape for operation within the range of different sizes and configurations of various rings. Also shown in FIG. 13 are corresponding magnetic field lines based on radiation patterns of the transceivers 50, 58.

Figure 14:
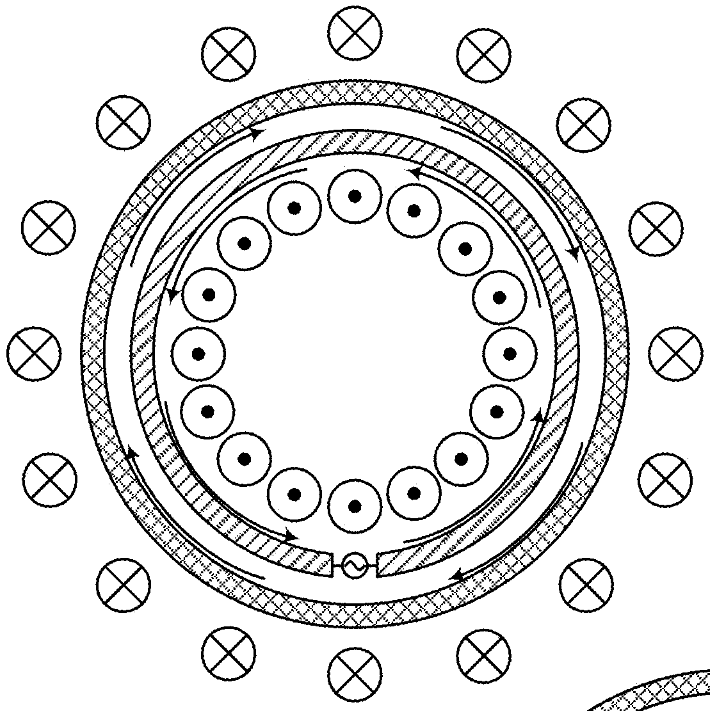
FIG. 14 is a diagram illustrating a cross-sectional view of the antenna of FIG. 1 and corresponding magnetic fields, according to various embodiments.
Figure 15:
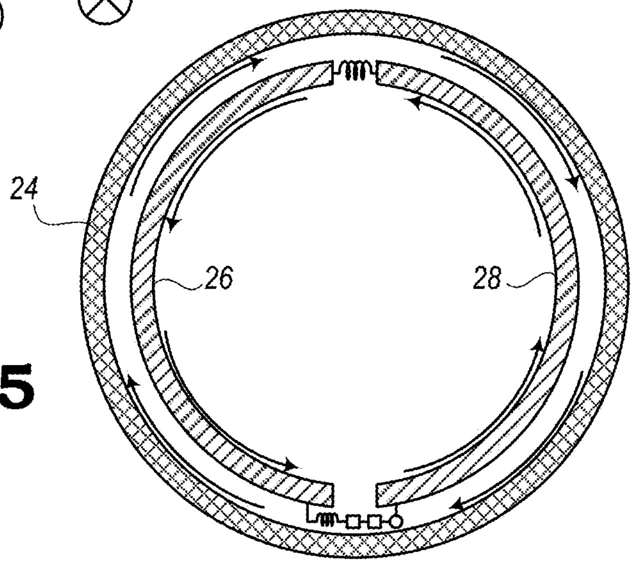
FIG. 15 is a diagram illustrating currents in a loop antenna arrangement with parasitic currents, according to various embodiments.

FIG. 14 is a cross-sectional view of the antenna 10 from a top perspective, where the antenna 10 is parallel to the page and the magnetic field lines extend orthogonally with respect to the page. For example, the circles with dots represent a direction of the magnetic field coming out of the page and circles with Xs represent a direction of the magnetic field going into the page. Also, the arrows in the counter-clockwise direction represent the direction of current in the loop antenna, while arrows in the clockwise direction represent the direction of parasitic current in the metallic layer 24. FIG. 15 also shows the currents in a loop antenna arrangement with the parasitic currents. In the lower frequency arrangement (e.g., about 13.56 MHz), the NFC blocking element 46 (e.g., capacitor) is "open" and the loop antenna is effectively formed by the first and second antenna components 26, 28, surrounded by the parasitic element of the metallic layer 24.

Pairing Between a Smart Ring and the Charging Case

A wearable device, such as the smart ring, may include a casing and an internal sensor arranged within the casing. The internal sensor is configured to electrically receive user input that is unrelated to manipulation of user-actuated mechanical components moveable with respect to the casing. In addition, the wearable device further includes a decoding device configured to decode the user input as a request to change the state of a wireless communication link with the charging case. Again, in addition to a smart ring, this can include any wearable devices (e.g., rings, watches, glasses, smart glasses, necklaces, earrings, pendants, earbuds, headphones, Virtual Reality (VR) goggles, Augmented Reality (AR) googles, Extended Reality (XR) goggles, heart monitoring devices worn on the wrist, etc.). Some of these wearable devices may include a small form factor, particularly a ring (or smart ring) that is worn on the finger of a user. Accordingly, any type of known or to be known smart or intelligent wearable device (e.g., intelligent jewelry, ornaments and/or devices, for example) would be understood to be chargeable via the disclosed configurations and functionality by one of ordinary skill in the art without departing from the scope of the instant application.

By moving the wearable device in a particular sequence or pattern of motions (e.g., by moving a smart ring in a circular motion), user input can be obtained by utilizing sensors (e.g., accelerometers) built into the device. This motion may be interpreted as control input and/or may also be interpreted as a request to change the state of a wireless communication link between the wearable device and a secondary device (e.g., mobile phone, access point, gateway device, router, modem, etc.) in a wireless network. In an embodiment, the secondary device is the charging case. Using this motion, it is possible to design the charging case without a button or equivalent, providing a better design.

Figure 16:
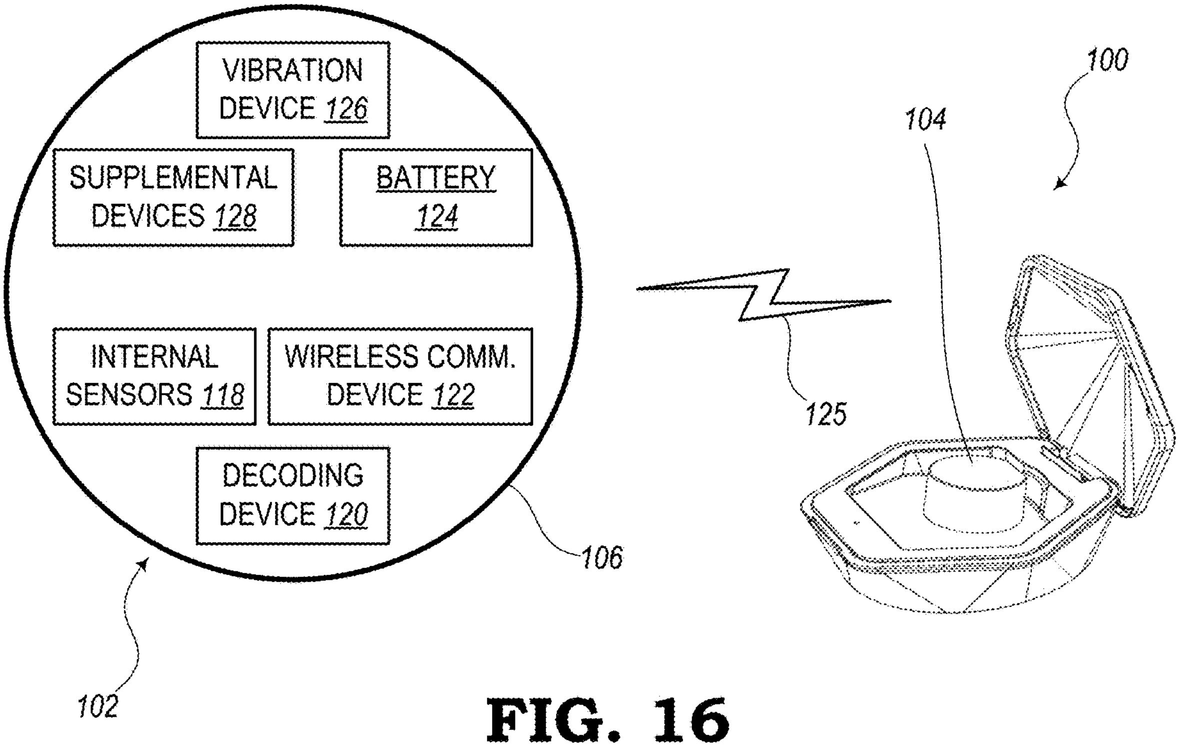
FIG. 16 is a diagram illustrating wireless connectivity between a charging case and a smart ring.

FIG. 16 is a diagram illustrating wireless connectivity between a charging case 100 and a smart ring 102. In an embodiment, the smart ring 102 can communicate wirelessly for data and pairing with the charging case 100, as well as for charging via NFC, such as via an NFC charger 200 (see FIGS. 18A and 18B, described below). In some embodiments, the charging case 100 and the smart ring 102 can each utilize the antenna 10 for NFC charging. The smart ring 102 can charge via the antenna 10 and NFC when the smart ring 102 is on a post 104 in the charging case 100. The smart ring 102 can communicate via BT when the smart ring 102 is near the charging case 100. In an embodiment, the post 104 includes the antenna 10 embedded therein, e.g., as a charging coil, and the smart ring 102 includes the antenna 10 as part of a wireless communication device 122. Note, FIGS. 31-33, as described below, illustrate exploded views of interior components of the charging case 100, depicting how the antenna 10 can be embedded within the post 104.

Again, the smart ring 102 can be any type of mobile device that can be worn by a user. For example, the smart ring 102 may have the form of a ring or other type of band around the finger of the user, as well as any other type of wearable device such as a watch or other type of band around the wrist of the user, necklace, lanyard, or other type of strap or strip that hangs around the neck of the user, a pendant, glasses, etc. For simplicity, embodiments described in the present disclosure are directed to the wearable device being the smart ring 102. However, it should be noted that the wearable device may include other forms, as mentioned herein, and are not limited to just the ring form.

In some embodiments, the smart ring 102 may include a casing 106 or housing that is configured to surround and protect internal electrical circuitry. The internal circuitry may include one or more internal sensors 118, a processing device 120, a wireless communication device 122, and a battery 124. The one or more internal sensors 118 may include one or more accelerometers, one or more gyroscopic devices, one or more capacitance sensors, one or more NFC signal detection devices, one or more optoelectronic sensing devices, etc.

The processing device 120 may include decision functionality, such as a decoding module or decoding device for translating, decoding, or interpreting user input from the one or more internal sensors 118 from raw data into a user request or command. In this way, the way may purposefully move the smart ring 102 or provide a force to the wearable device in such a manner (e.g., using a sequence or pattern of motions, forces, taps, etc.) that the processing device 120 can decipher this user input as a request. In some cases, the request can be a request to perform control actions on the smart ring 102 or other external devices such as the charging case 100. However, according to the preferred embodiments of the present disclosure, the request may be interpreted as a request to change a state of a wireless communication link 25 between the smart ring 102 and the charging case 100.

In some embodiments, the smart ring 102 may also include a vibration device 26 for providing haptic or tactile feedback to the user in response to receiving user input or for acknowledging the reception of a command or request. Also, in some embodiments, the smart ring 102 may further include one or more supplemental devices 128, such as one or more microphones, one or more cameras, one or more speakers or tone generating devices, and/or one or more light generating devices (e.g., LEDs).

It may be noted, therefore, that the smart ring 102 and/or the charging case 100 do not have any externally accessible buttons, keys, switches, slides, etc., which may be defined as conventional user-actuated mechanisms. Instead, the one or more internal sensors 118 are configured to detect presence or nearness (e.g., using capacitance sensing), detect NFC signals, detect motion (e.g., using accelerometers or gyroscopic devices), etc. In some cases, the one or more internal sensors 118 may also include optoelectronic devices for sensing image codes (e.g., barcodes, etc.). Thus, without moveable mechanisms (e.g., buttons, switches, etc.) on the surface of the casing 106, the smart ring 102 of the present disclosure can be more waterproof compared to conventional devices where a user manipulates surface-mounted user-actuated mechanisms. The charging case 100 of the present disclosure may be referred to as a buttonless device, switchless device, etc.

According to one embodiment, the internal sensor 118 may include a capacitance sensor to detect if the smart ring 102 is on the finger of the user or is on an NFC charger or on some other component, i.e., the post 104. Also, the internal sensor 118 may include a wireless charger sensor (e.g., NFC sensor) for determining if the smart ring 102 is on a post of an NFC charger. Furthermore, the internal sensor 118 may include an optoelectronic sensor (e.g., Photoplethysmography (PPG) sensor) for detecting LED reflection. Various conditions (e.g., on finger, off finger, on post, off post (relative to the post 104), etc.) may be decoded as requests (e.g., factory set or customized) to pair the smart ring 102 with the charging case 100 (i.e., set up the wireless communication link 125 between the two) or to break down or close the wireless communication link 125.

Regarding the application of one or more capacitance sensors, the internal sensors 118 may detect if the smart ring 102 is on the user's finger. For example, the status or condition of the ring on the finger can be indicated with a binary 1, while the status or condition of the ring off the finger can be indicated with a binary 0. The processing device 120 may be configured to use any suitable on/off sequence (e.g., 010101, or off-on-off-on-off-on), within a limited time, to recognize the intention to enter user input for requesting that the wireless communication link 125 is turned on to pair the smart ring 102 with the charging case 100. In other words, the user may repeatedly move the smart ring 102 on and off the user's finger within a short amount of time. The processing device 120 or decoding device may interpret this as a request to set up the wireless communication link 125 (e.g., turning on a Bluetooth pairing mode).

Similarly, an on/off sequence of, say, "101010" may be interpreted as a user request to turn off the Bluetooth pairing mode or close or break down the wireless communication link 125. For example, repeated on/off patterns may be analyzed by the processing device 120, where ending in a one means that the user is requesting to turn on the wireless communication link 125 and ending in a zero means that the user is requesting to turn off the wireless communication link 125.

The smart ring 102 may also have a similar way of talking with an NFC charger or charging case 100. Again, if the smart ring 102 is on the NFC charger (post 104), this may be indicated by a binary 1 and, if the smart ring 102 is off the NFC charger, this may be indicated by a binary 0. The processing device 120 or decoding device may be configured to operate in a way that is similar to the "finger" example above. In other embodiments, the opposite state of the wireless communication link 125 may be maintained with respect to the on or off condition. For example, when the wearable device 112 is on the post 104 of the NFC charger (e.g., binary one), the wireless communication link 125 may be turned off, whereby, when the smart ring 102 is off the post 104 of the NFC charger (e.g., binary zero), the wireless communication link 125 may be turned on.

The specific codes, sequences, or patterns of conditions may, in effect, be equivalent to a user's action of manipulating a conventional button for turning on or turning off a Bluetooth or Wi-Fi pairing. The codes, sequences, or patterns may be customized user-defined codes or factory-set codes.

Furthermore, a more complex way of entering user input is to make use of one or more optoelectronic sensors, such as the PPG sensors. In this case, the optoelectronic sensors may be configured to read an image code (e.g., barcode or other type of visually detectable code). In the example of a ring, the image code may be printed or applied in any other suitable manner to a post. For example, the post may be a charging pole (or rod) of an NFC charger or, in other embodiments, may simply be a post used exclusively for the purpose described herein. In the example of other types of wearable devices, the image code can be applied to any suitable surface.

Then, when the smart ring 102 is placed on the post 104 (or move close to the image code), the smart ring 102 may be configured to turn on a light associated with the sensor for a short time. During this time, the user can twist the smart ring 102 around the post 104 (or move the smart ring 102 is another suitable manner with respect to the image code). A photodetector of the smart ring 102 may be configured to read the image code (e.g., similar to scanning a barcode). Arbitrary image codes may be used for these predefined purposes. In some embodiments, a counter-clockwise twisting of the smart ring 102 may represent a user request to open up the wireless communication link 125 (i.e., turn on the Bluetooth pairing), while a clockwise twisting of the ring may represent a user request to close the wireless communication link 125 (i.e., turn off the Bluetooth pairing).

Again, the one or more internal sensors 118 may include one or more accelerometers for measuring force, acceleration, vibration, movement, motion, etc. A particular tap pattern on the casing 106 of the smart ring 102 may be interpreted as a request to pair with the charging case 100. In response to decoding this user input, the processing device 120 can be configured to cause the wireless communication device 122 to open up the Bluetooth pairing or wireless communication link 125 with the charging case 100 to go into the pairing mode. The tap pattern could be user-defined. In this case, the user-defined pattern may prevent others (e.g., malicious strangers) from knowing a pattern and using the user's smart ring 102 without permission. In some case, a factory-based pattern may be used, such as Morse code using various combinations of quick taps and long taps.

In addition to tap patterns, the accelerometers may be used to measure motions. For example, moving the smart ring 102 in a particular pattern could be interpreted as a user request to pair, which can be following by the action of causing the wireless communication device 122 to go into the pairing mode. In some examples, the movement pattern may include moving the smart ring 102 in a figure-eight shape, making repeated circular motions in one or multiple directions, etc.

Additionally, customized patterns may be performed to mimic certain actions that a user may take at certain times when it may be desirable to turn on the wireless communication link 125. For example, one pattern could mimic the user's action when he or she might typically want to turn on the Bluetooth pairing, such as when the user comes home. The action pattern may include movements of the fingers, hands, etc. that the user might make when he or she first gets home, such as the action of turning a key in a lock to unlock a front door to the home and pushing the door open.

In accordance with some embodiments, the smart ring 102 may further include the supplemental devices 128. Some devices may have a microphone. The microphone could be used to interpret a speech phrase, such as "ring, go into pairing mode." The microphone could also listen for a user tapping on a table top or other surface in a particular pattern (e.g., Morse code). Another input device of the supplemental devices 128 may include a camera. The camera could detect a particular hand gesture (e.g., waving a hand or finger, repeating gestures, thumb up and thumb down patterns, etc.). The camera may also be configured to scan an image or code (e.g., barcode, QR code, etc.) related to user input, which can result in the smart ring 102 going into pairing mode when these are detected.

The supplemental devices 128 may also include output devices. For example, the smart ring 102 may include a speaker or tone generator. The speaker or tone generator might provide an audio signal to confirm that the user request to enter pairing mode has been received or recognized or that the Bluetooth pairing has been opened in response to the user request. Another output device may be an LED or other light source. The light source may shine a particular pattern or color to indicate that the user request has been received or that the device has gone into pairing. Different blinking patterns and colors may be used to indicate different things.

The charging case 100 may also be associated with a case for storing the smart ring 102 when not in use and/or for recharging batteries on the smart ring 102. This may be a buttonless devices, as mentioned herein, where there are no buttons for changing the state of wireless communication link 125. In some cases, the smart ring 102 may include other types of buttons for purposes other than for changing the pairing.

Figure 17A:
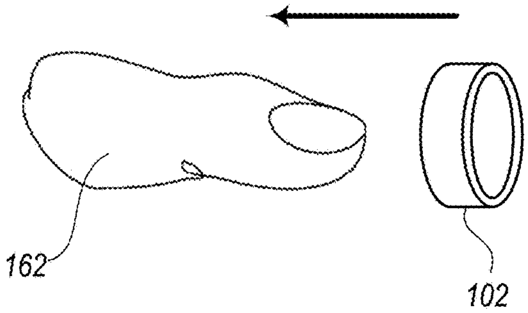
FIGS. 17A and 17B are diagrams illustrating detectable actions of placing the smart ring on the user's finger and removing the smart ring from the user's finger.
Figure 17B:
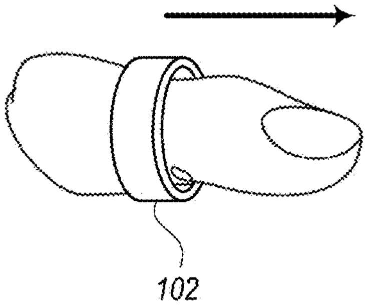

FIGS. 17A and 17B are diagrams illustrating detectable actions of placing the smart ring 102 on the user's finger and removing the smart ring 102 from the user's finger 162. In this example, the smart ring 102 makes use of an existing sensor (e.g., internal sensor 118 configured as one or more capacitance sensors) to detect if the smart ring 102 is on the finger 162 (or on a charger or other component having the post 104). As such, processing device 120 (or decoding device) of the smart ring 50 may use capacitance sensor to determine whether or not the smart ring 102 is on the finger 162 and output a binary 1 for "on" and a binary 0 for "off." The processing device 120 may determine the binary numbers over a certain amount of time. When a specific on/off sequence is detected within a limited time, the processing device 210 may be configured to force the wireless communication device 122 to open the wireless communication link 125 with the charging case 100. For example, a sequence of 01010101 (i.e., repeatedly moving the smart ring 102 on and off the finger 162 in a short amount of time) means that the user is entering a request to turn on the Bluetooth pairing mode. The last binary one may be an indication of an "on" request, while a last binary zero may be an indication of an "off" request for turning the Bluetooth pairing mode off.

Figure 18A:
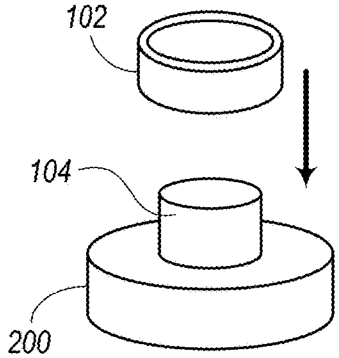
FIGS. 18A and 18B are diagrams illustrating detectable actions of placing the smart ring on a post of a Near Field Communication (NFC) charger and removing the smart ring from the post of the NFC charger.
Figure 18B:
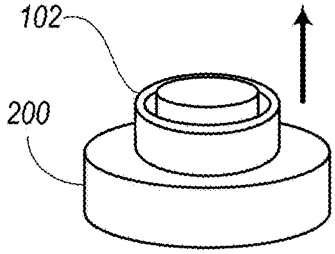

FIGS. 18A and 18B are diagrams illustrating detectable actions of placing the smart ring 102 on a post 104 of a Near Field Communication (NFC) charger 200 and removing the smart ring 102 from the post 104 of the NFC charger 200, as described herein. In this input approach, the user may move the smart ring 102 on and off the post 104 repeatedly within a short amount of time. The smart ring 102 may make use of an existing internal sensor 18 implemented as a wireless charger sensor (e.g., NFC sensor). The smart ring 102 may utilize the NFC sensor similar to the capacitance sensors mentioned above and/or detect the presence of NFC signals. The processing device 120 may output a binary one to indicate that the smart ring 102 is on the post 104 and a binary zero to indicated that the smart ring 102 is off the post 104. These codes may be same as described above or may be switched and may have a similar effect as a typical button press action for indicating whether to turn the Bluetooth pairing on or off. The particular sequence or pattern of codes could be user-defined or factory set codes. In an embodiment, the NFC charger 200 is in the charging case 100 and includes the antenna 10. Again, as mentioned above and described in more detail below, FIGS. 31-33 are exploded views of interior components of the charging case 100, which, in some embodiments, depict how the antenna 10 can be embedded within the post 104 as part of an NFC charger 200.

Figure 19A:
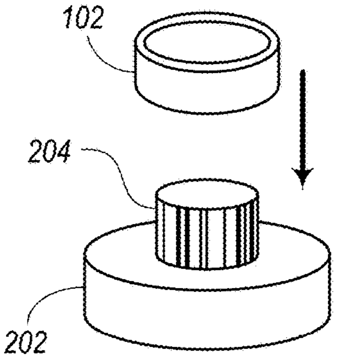
FIGS. 19A-19C are diagrams illustrating the use of an image code for enabling the entry of a user request to change the state of the wireless communication link with the charging case.
Figure 19B:
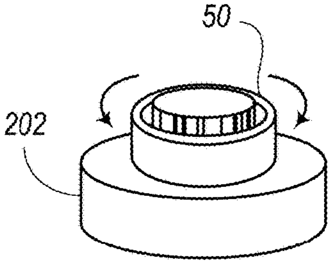
Figure 19C:
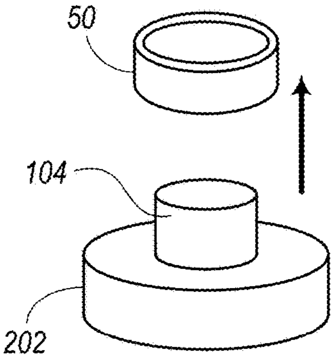

FIGS. 19A-19C are diagrams illustrating the use of an image code for enabling the entry of a user request to change the state of the wireless communication link with the charging case 100. In this embodiment, the internal sensor 118 of the smart ring 102 may be implemented as an optoelectronic sensor (e.g., PPG sensor for detecting LED reflection). The output can be used to trigger the smart ring 102 to turn on or turn off a Bluetooth pairing. The smart ring 102 may be used in association with a device 202 having a collar 204. Printed or applied to the collar 204 is an image code. In some embodiments, the device 202 may be an NFC charger 200 and the collar 204 may be a charging post 104. The image code may be a predetermined sequence of dark and light stripes (e.g., like a barcode or other type of scannable code). According to other embodiments in which the smart ring 103 includes another shape other than a ring, the image code may be place on any suitable object to enable scanning.

As shown in FIG. 19A, the user first places the smart ring 102 on the collar 204, which may be configured to trigger the smart ring 102 to utilize a light source or LED to project light onto the image code. Also, an optoelectronic sensor for sensing light reflection can be activated. Then, as shown in FIG. 9B, the user rotates the smart ring 102 and the optoelectronic sensor is configured to detect the image code. For example, in some embodiments, the image code may be readable (scannable) in both the clockwise direction and the counter-clockwise direction. For example, scanning in the counter-clockwise direction may be configured to produce an output that indicates a user request to open the wireless communication link 125, and scanning in the clockwise direction may be configured to produce an output that indicates a user request to close the wireless communication link 125, or vice versa. Based on the appropriate request, the processing device 120 is configured to cause the wireless communication device 122 to open or close the Bluetooth pairing link. Then, as indicated in FIG. 19C, the smart ring 102 can be removed.

Processes

Figure 20:
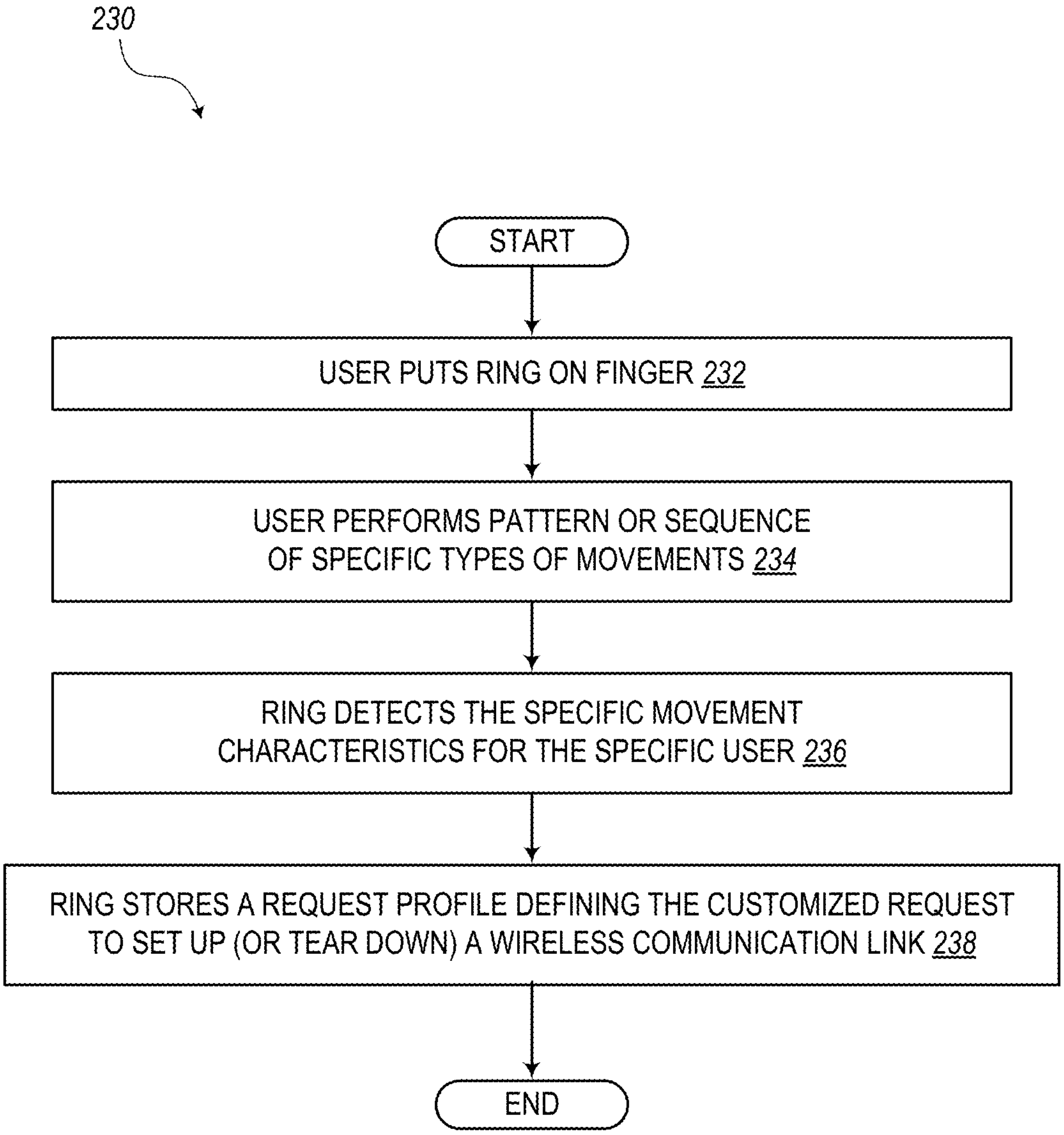
FIG. 20 is a flow diagram illustrating an embodiment of a process for customizing a user request to change the state of a wireless communication link with a secondary device.

FIG. 20 is a flow diagram illustrating an embodiment of a process 230 for customizing a user request to change the state of a wireless communication link with a secondary device. In particular, the process 230 may apply to cases where one or more accelerometers are used to detect motion. As illustrated, the process 230 includes the step of allowing the user to place the ring on his or her finger, as indicated in block 232. This may include placing the smart ring 102 on the finger 162, or, alternatively, may include placing any type of wearable device on a corresponding part of the body of the user where movement patterns can be detected. The process 230 further includes allowing the user to perform a pattern or sequence of specific types of movement, as indicated in block 234. According to other embodiments, the process 230 may include movement detection with respect to an external object (e.g., finger 162, post 104, collar 204, etc.).

Next, the process 230 includes the step of detecting, by the smart ring, the specific movement characteristics for the specific user 236. Then, the process 230 includes storing, by the ring, a request profile defining the customized user request to set up (or tear down) a wireless communication link, as indicated in block 238. The process 230 may be performed once for the turn-on request profile customization and repeated for the turn-off request profile customization.

Figure 21:
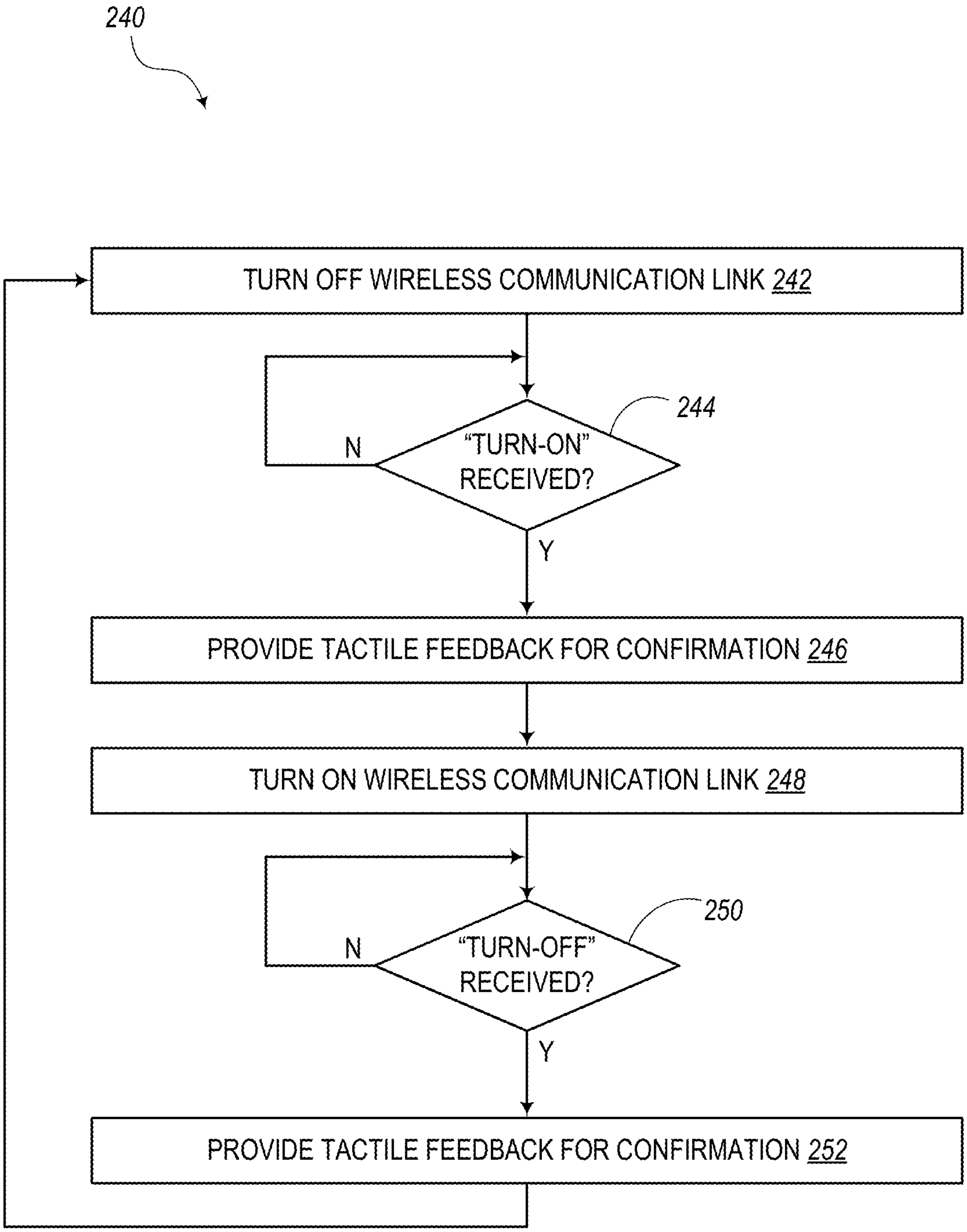
FIG. 21 is a flow diagram illustrating an embodiment of a process for changing the state of the wireless communication link between a wearable device and a charging case.

FIG. 21 is a flow diagram illustrating an embodiment of a process 240 for changing the state of the wireless communication link between a wearable device and a charging case. Initially, the process 240 may include turning the wireless communication link off, as indicated in block 242. The process 240 then includes determining whether or not a request to turn-on the wireless communication link has been received, as indicated in condition diamond 244. If no such request is received, the state of the wireless communication link remains off. However, if a request to change the state is received, the process 240 proceeds to block 246, which includes the step of providing feedback (e.g., vibration) to the wearable device to indicate to the user that the request has been received. Also, the process 240 turns the wireless communication link on.

Then, the process 240 includes determining whether or not a request to turn-off the wireless communication has been received, as indicated in condition diamond 250. If no such request is received, the state of the wireless communication remains on. However, if a request to change the state is received, the process 240 proceeds to block 252, which includes the step of providing feedback (e.g., vibration) to the wearable device to indicated to the user that the request has been received. Also, the process 240 loops back to block 242 and turns the wireless communication link off.

Charging Case

Figure 22:
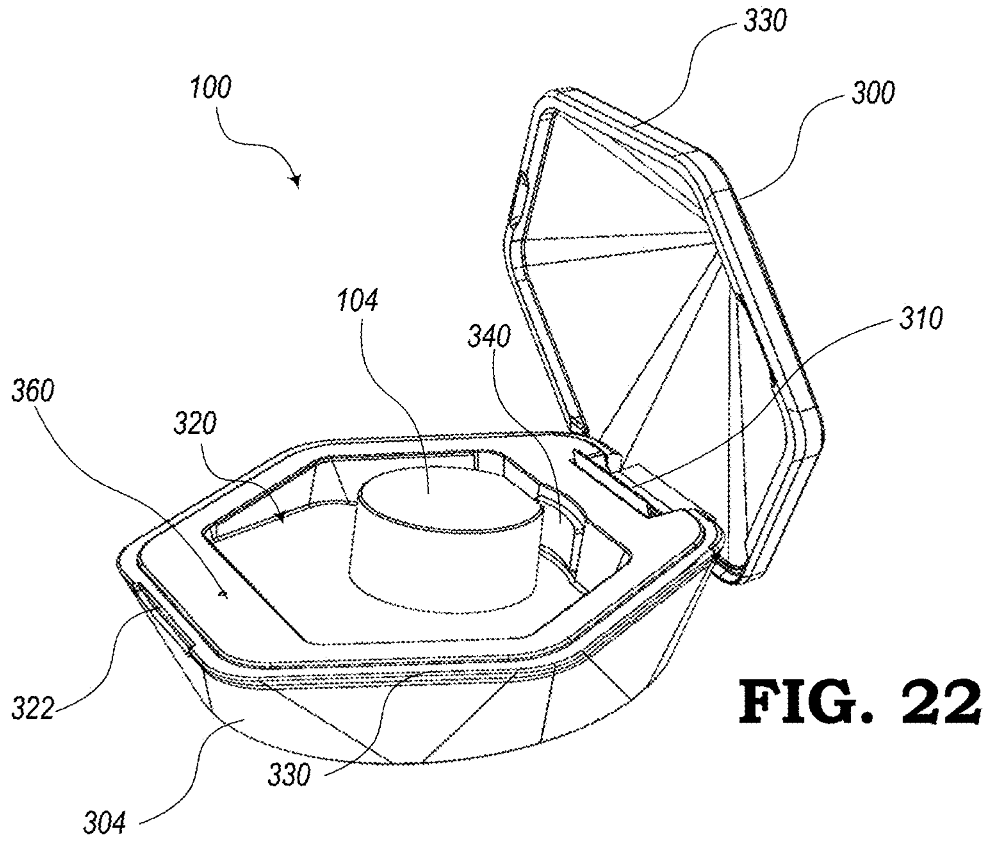
FIG. 22 is a perspective diagram of the charging case with a front cover open.
Figure 23:
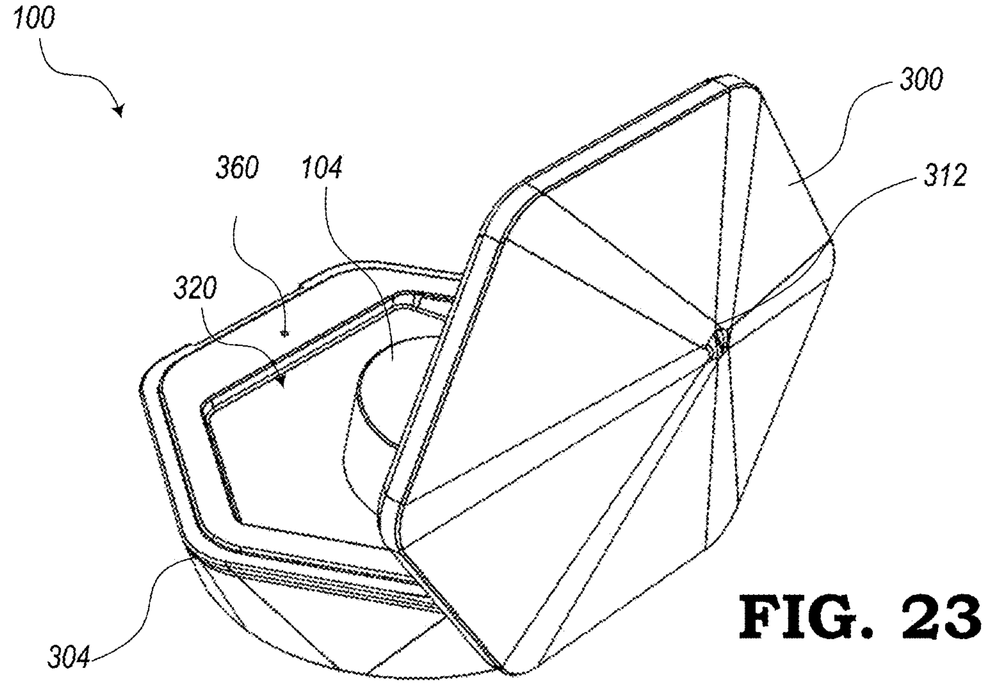
FIG. 23 is another perspective diagram of the charging case with the front cover open.
Figure 24:
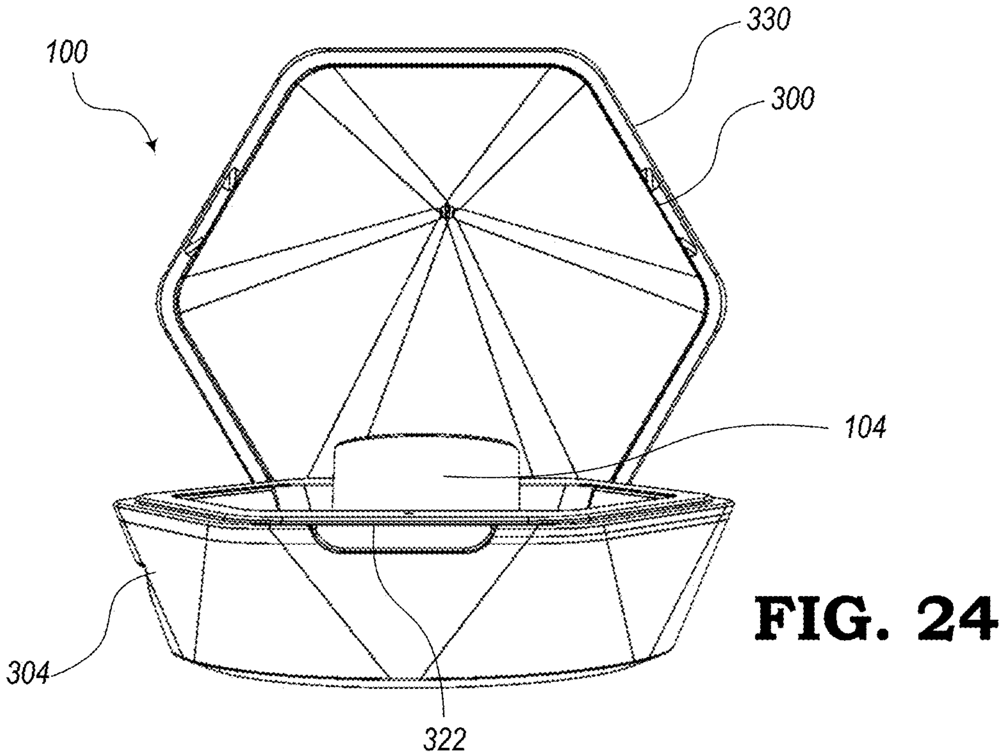
FIG. 24 is a front perspective diagram of the charging case with the front cover open.
Figure 25:
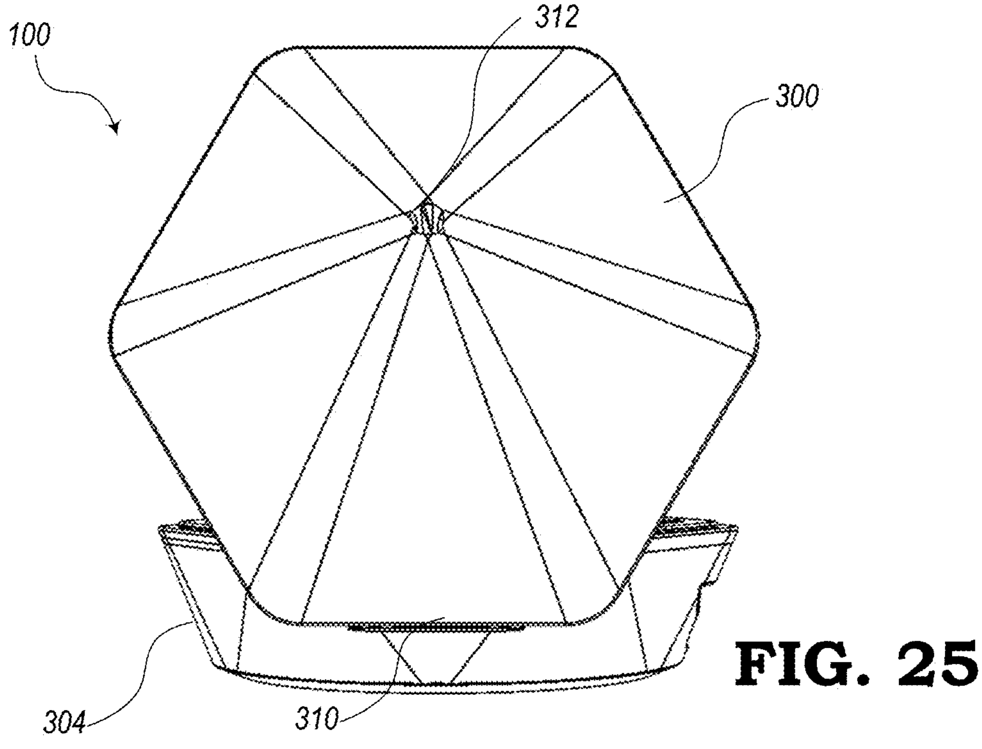
FIG. 25 is a rear perspective diagram of the charging case with the front cover open.
Figure 26:
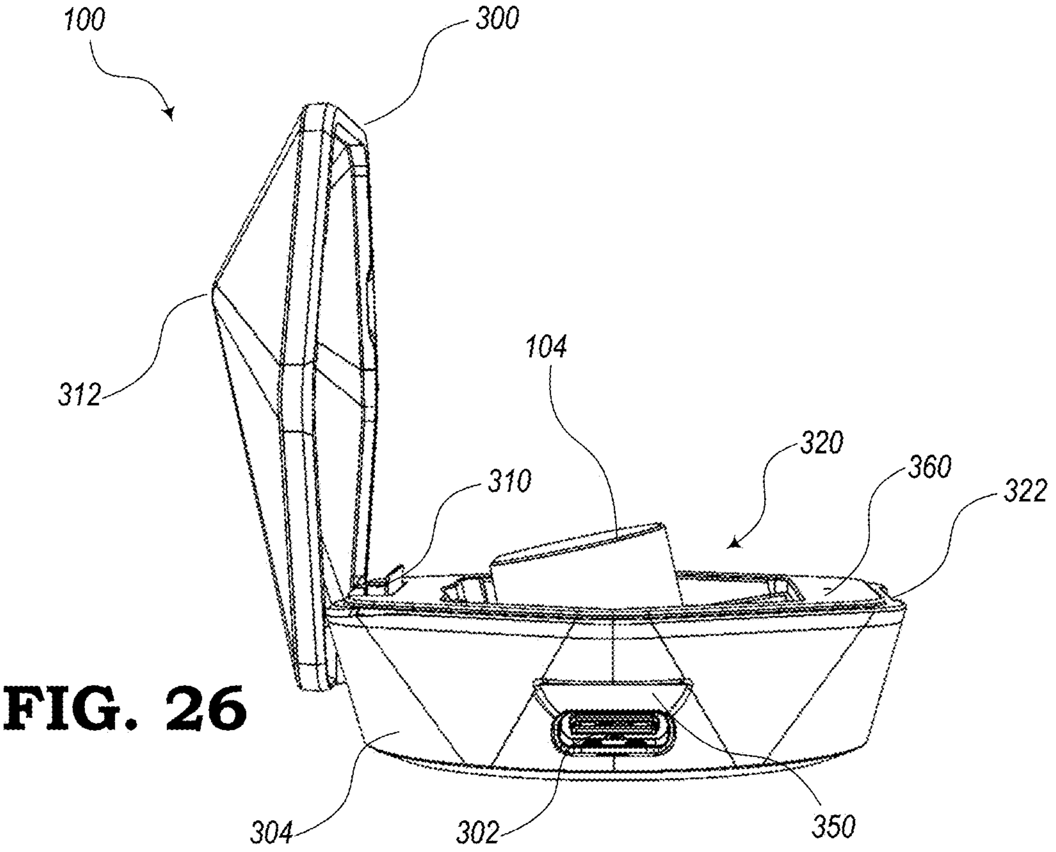
FIG. 26 is a side perspective diagram of the charging case with the front cover open and with a charging port.
Figure 27:
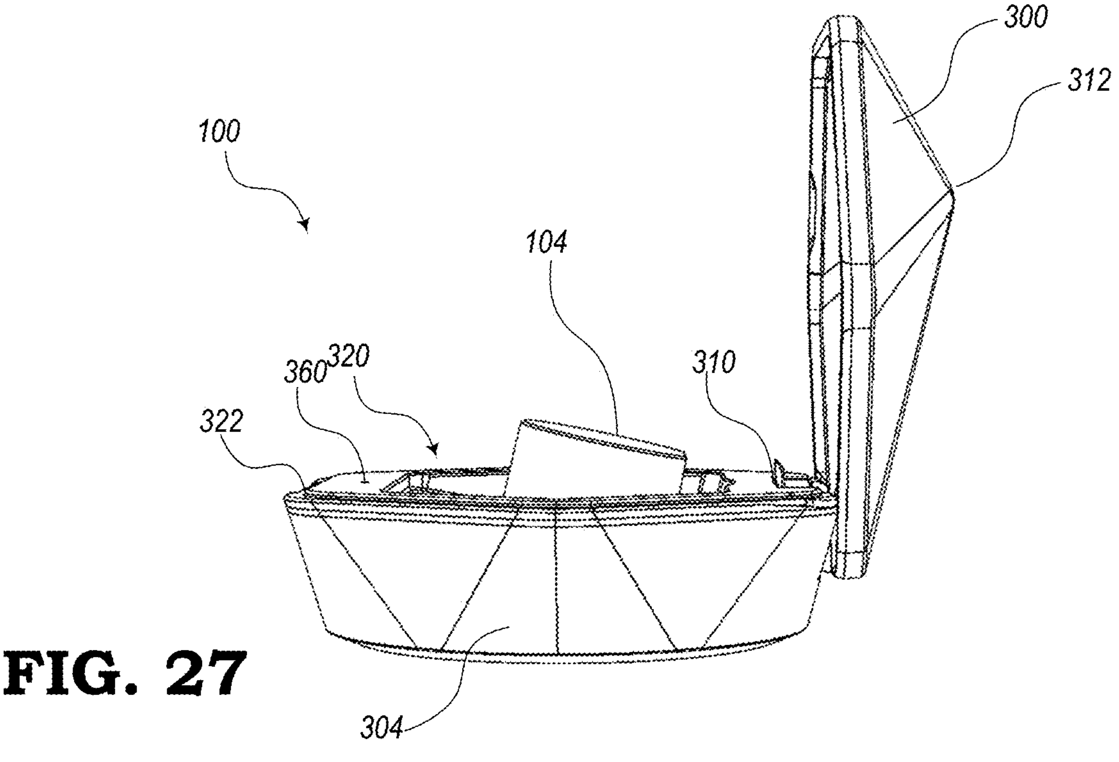
FIG. 27 is another side perspective diagram of the charging case with the front cover open.

FIG. 22 is a perspective diagram of the charging case 100 with a front cover 300 open. FIG. 23 is another perspective diagram of the charging case 100 with the front cover 300 open. FIG. 24 is a front perspective diagram of the charging case 100 with the front cover 300 open. FIG. 25 is a rear perspective diagram of the charging case 100 with the front cover 300 open. FIG. 26 is a side perspective diagram of the charging case 100 with the front cover 300 open and with a charging port 302. FIG. 27 is another side perspective diagram of the charging case 100 with the front cover 300 open.

Figure 28:
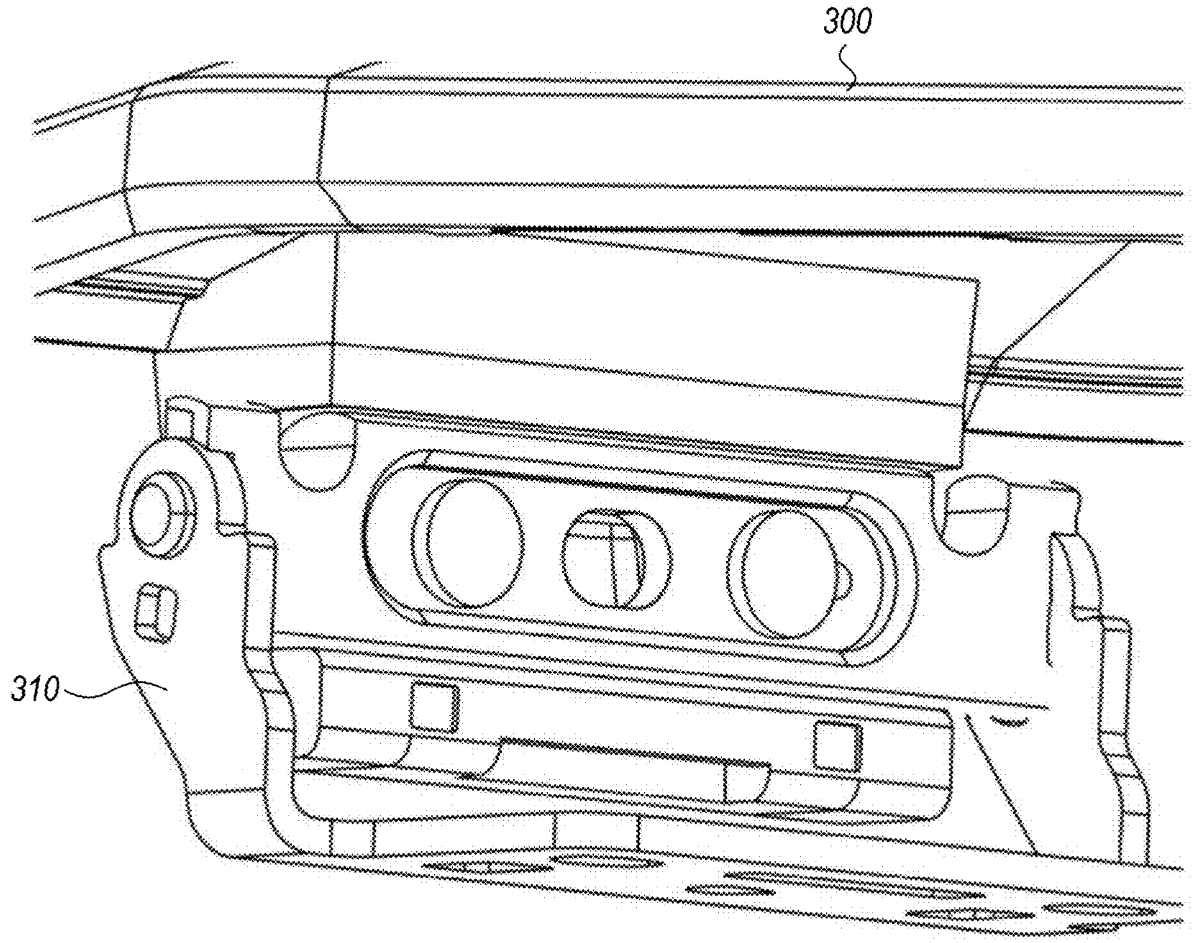
FIG. 28 is a perspective diagram of the front cover of the charging case with a hinge for connectivity to the base.

The charging case 100 includes the front cover 300, a base 304, and an interior 306 that includes the post 104. The front cover 300 is configured to rotate via a hinge 310 connected to the base 304 (see FIG. 28, as described below). In some embodiments, front cover 300 and the base 304 can include a hexagonal design with six sides. Accordingly, the size, shape and design of the cover can vary based on a number sides, dimensions of the sides, and the like, or some combination thereof. In some embodiments, the front cover 300 can include diagonal sides that meet proximate to a center at a point 312, as depicted in FIG. 23, for example. The shape of the point 312 can vary in radius, circumference, diameter, etc., which can be based on the shape and dimensions of diagonal sides. In another embodiment, the diagonal sides can extend to a flat or curved surface on the front cover 300 instead of the point 312. An interior 320 of the charging case 100 includes the post 104. The post 104 is dimensioned to support the smart ring 102. A user is able to open and close the front cover 300 via a tab 322 and the hinge 310. The front cover 300 and the base 304 can include a seal 330 that mates when closed for sealing the interior 320.

Figure 29:
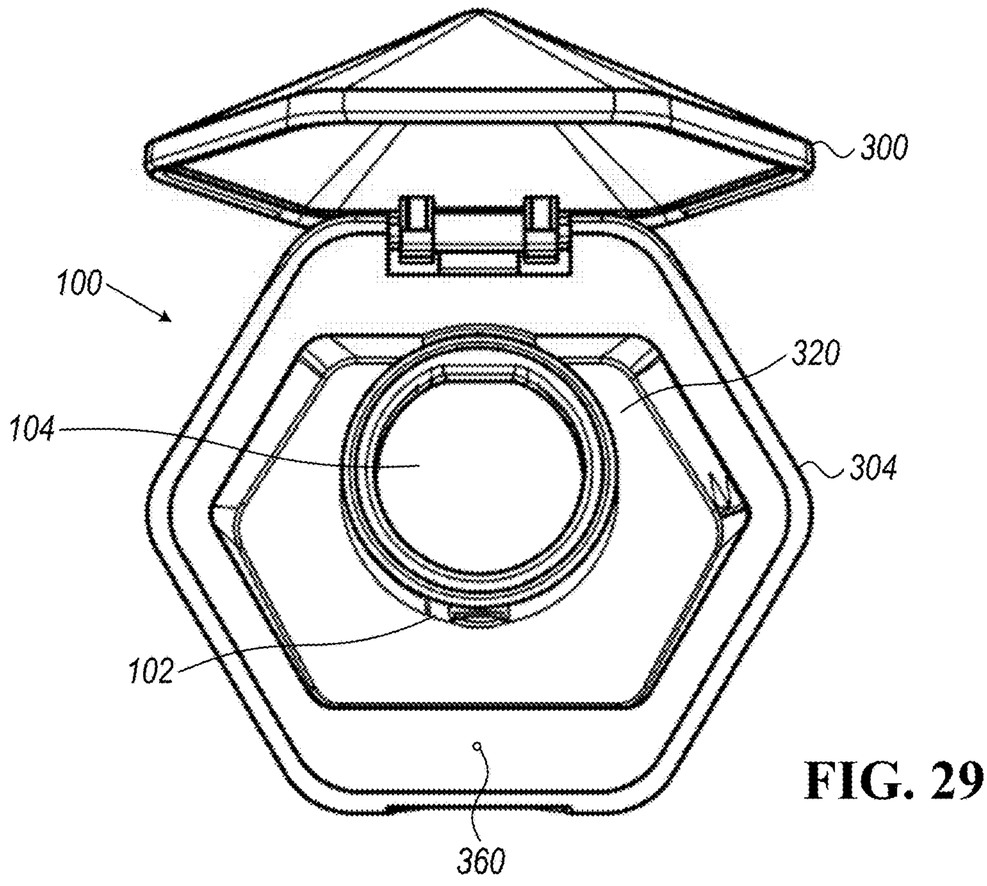
FIGS. 29 and 30 are top views of the charging case with the front cover open, with (FIG. 29) and without (FIG. 30) a smart ring on the post.
Figure 30:
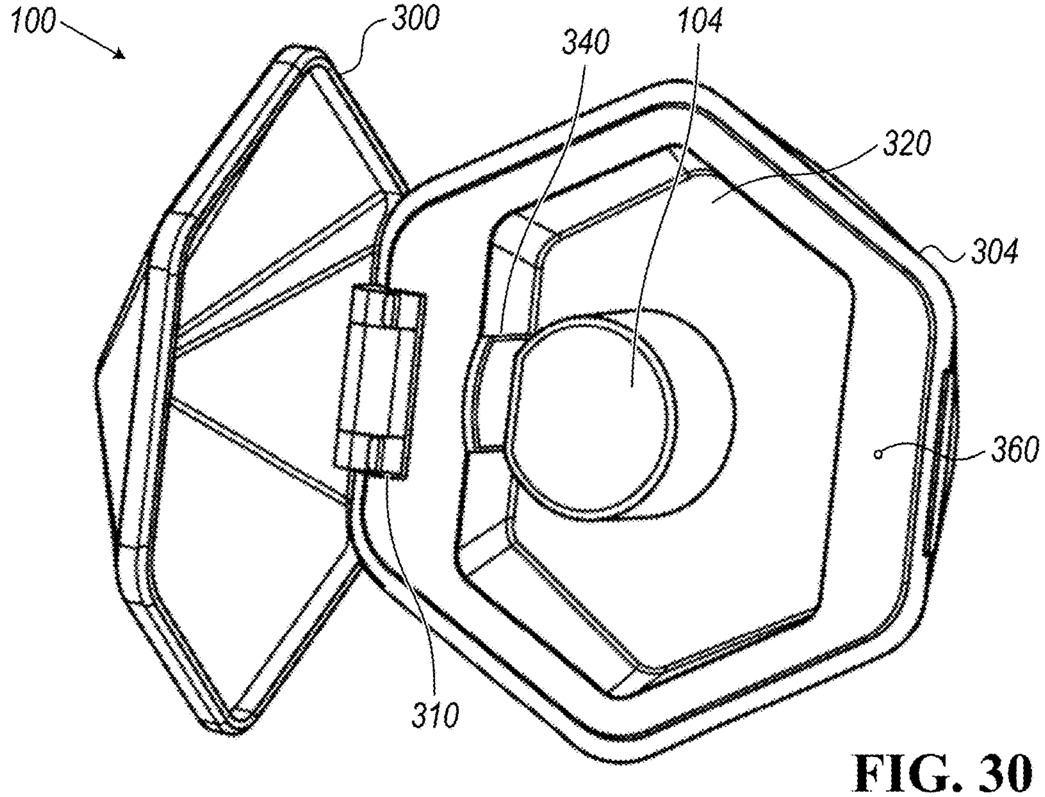

The post 104 can include the antenna 10 in the interior, surrounded by a material to support the smart ring 102. In an embodiment, the post 104 is slightly at an angle on the base 104, specifically angled towards the front cover 300 when open. In some embodiments, the angle can be in accordance with a predetermined range, such as, for example, 5 to 30 degrees. In some embodiments, the angle can be preset, and in some embodiments, the post 104 can be adjustable within the range of the angle so as to enable engagement and disengagement of the NFC charger 200 via a piece of chargeable ornamental jewelry/device, as described herein. In some embodiments, the post 104 can be perpendicular to the base 104. In some embodiments, the post 104 can be angled away from the front cover 300 when open, such as to allow a user to place the smart ring 102 easier. Accordingly, in some embodiments, the post 104 can be angled in any radial, normal direction from the axis of base 104. Since different smart rings 102 may be different sizes, there is a desire to have the charging case 100 support all different sizes. The angle of the post 104 and a wedge 340 ensure all different sizes of ring are supported. FIGS. 29 and 30 are top views of the charging case 100 with the front cover 300 open, with (FIG. 29) and without (FIG. 30) a smart ring 102 on the post 104. The wedge 340 can be an insert, e.g., rubber, etc. that is used to cause the ring 102 to fit properly on the post 104. There can be different size wedges 340 based on the size of the ring 102. For example, the wedge 340 for a size 6 ring 102 would be larger than the wedge 340 for a size 12 ring 102. Further, some sizes of ring 102 may not necessarily need the wedge 340. The charging port 302 can be Universal Serial Bus (USB) or the like. There can be a rubber cover 350 that seals the charging port 302 when not in use.

As described herein for "buttonless pairing," the front cover 300 and the base 304 do not need any buttons, switches, touch display, or other user-actuation mechanisms. In an embodiment, the charging case 100 includes status lights via a light pipe 360. The light pipe 360 enables a light emitting diode (LED) or the like on a printed circuit board (PCB) 400.

Figure 31:
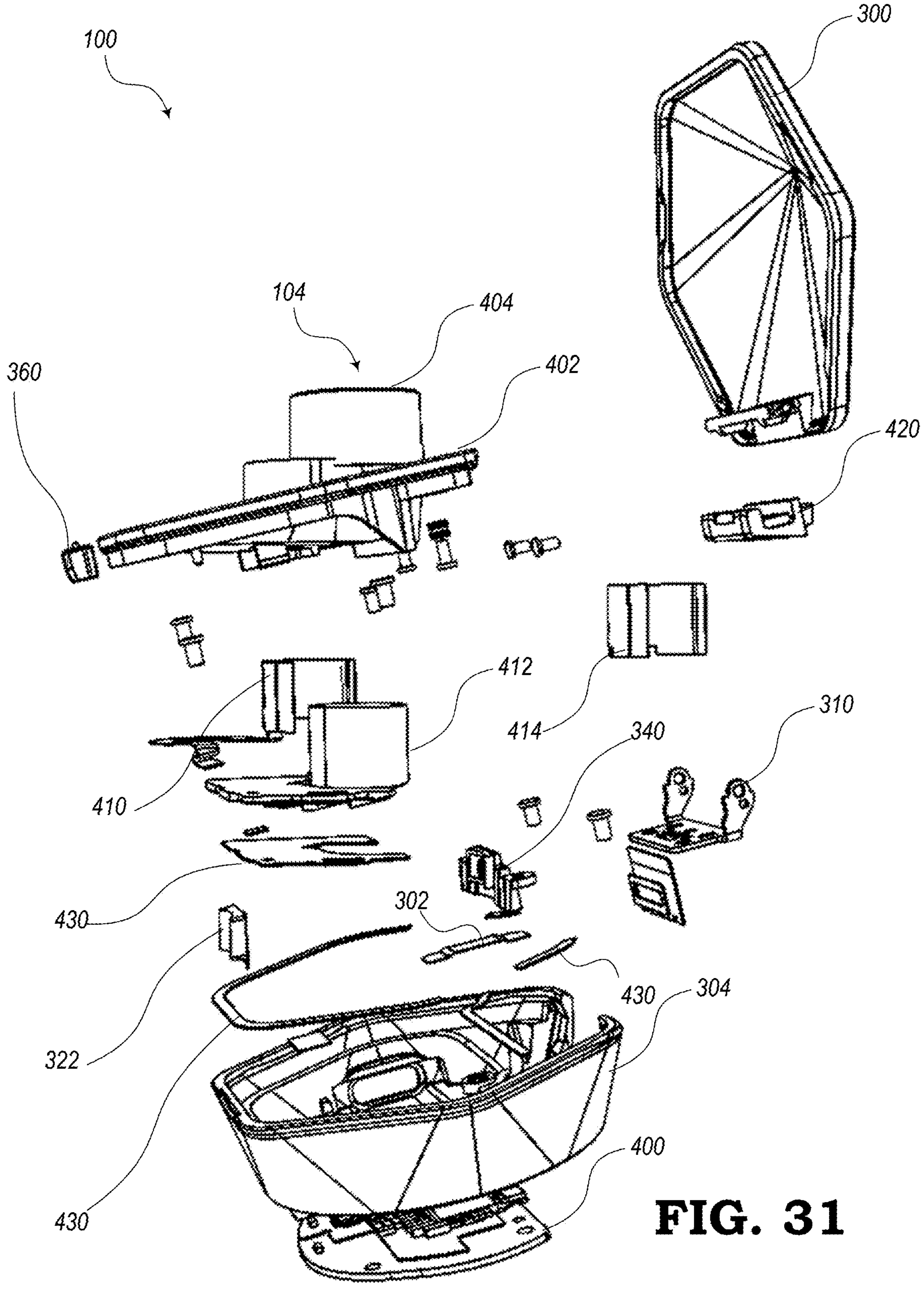
FIGS. 31-33 are exploded views of interior components in the charging case.
Figure 32:
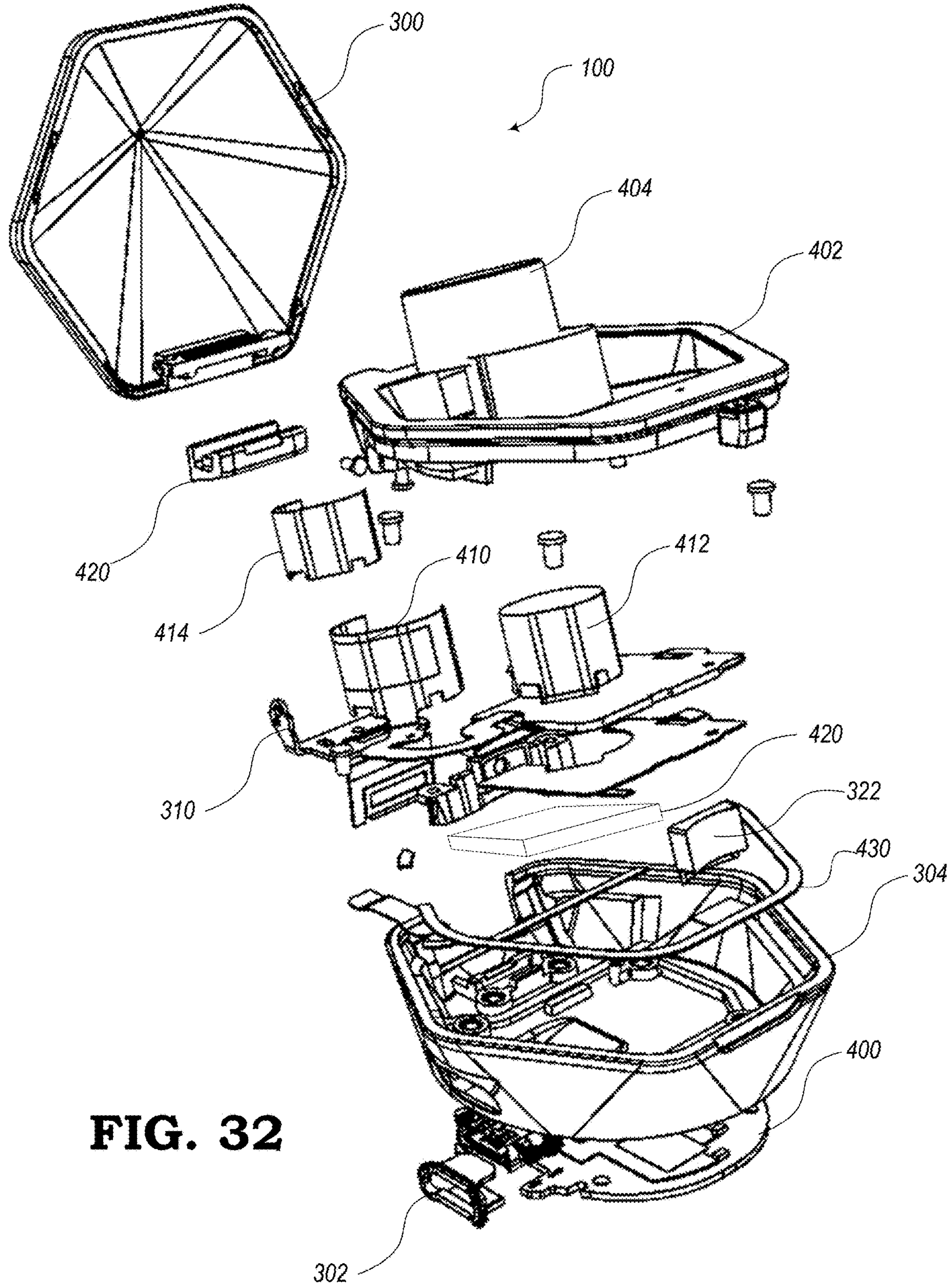
Figure 33:
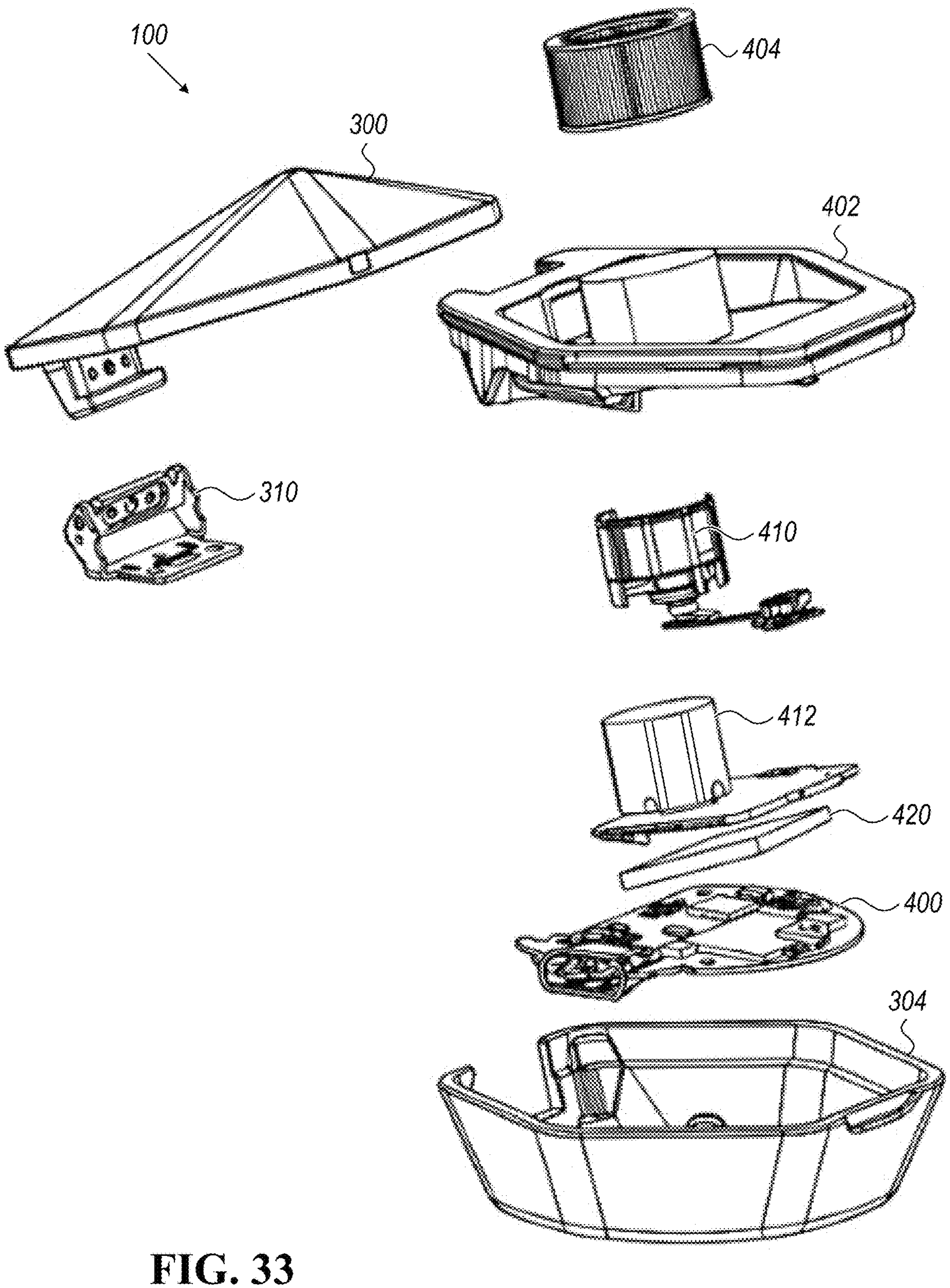

FIGS. 31-33 are exploded views of interior components in the charging case 100. The charging case 100 includes a middle frame 402 that sits on the base 304 to seal the interior components. The post 104 can include a rubber boot 404. The front cover 300, the base 304, and the middle frame 402 can be plastic, aluminum, or the like. The antenna 10 can include a flex PCB 410 and a flex holder 412. In some embodiments, the flex PCB 410 can be part of the antenna 10. In some embodiments, the flex PCB 410 wraps around the flex holder 412 and can be held in place by tape 414 (and/or any other type of adhesive, material or affixation object that enables the holder 412 to remain in place, for example). Note, in FIGS. 31-33, only the flex PCB 410 is shown for NFC charging, however, one of skill in the art would understand this to not be limiting. In addition, it is possible to include the other half as shown in the antenna 10 for Bluetooth communication. The front cover 300 can include an assembly 420 that connects to the hinge 310. Also, there are various tape strips 430 for attaching associated components. Further, in an embodiment, the charging case 100 can also include an embedded battery 420.

Figure 34:
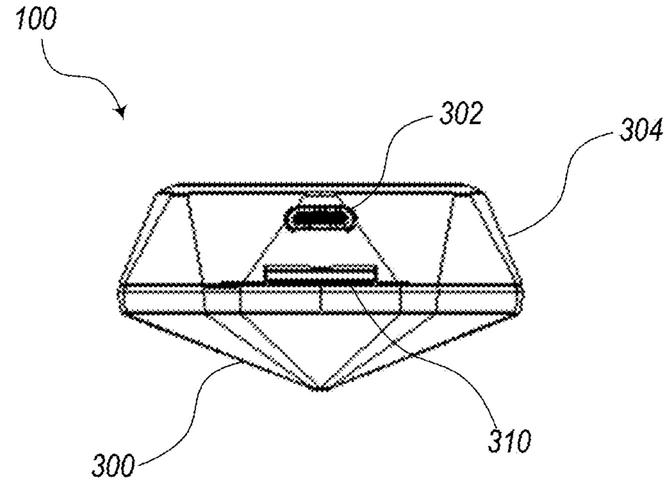
FIGS. 34-36 are various perspective diagrams of the charging case with the front cover closed on the base.
Figure 35:
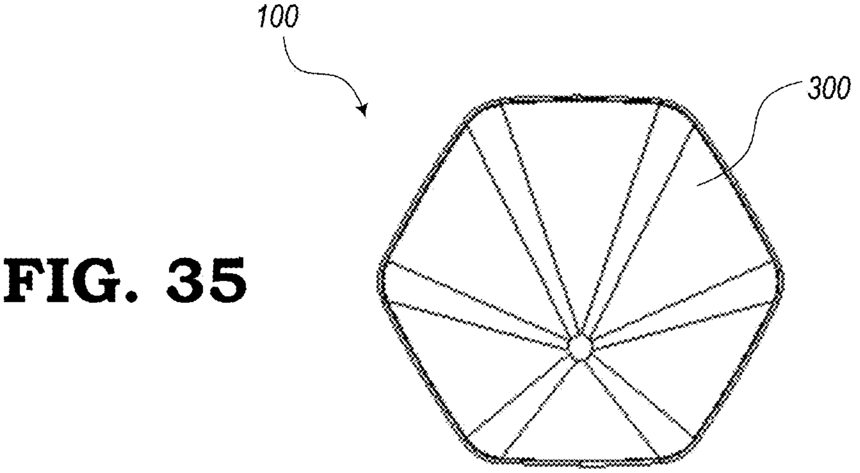
Figure 36:
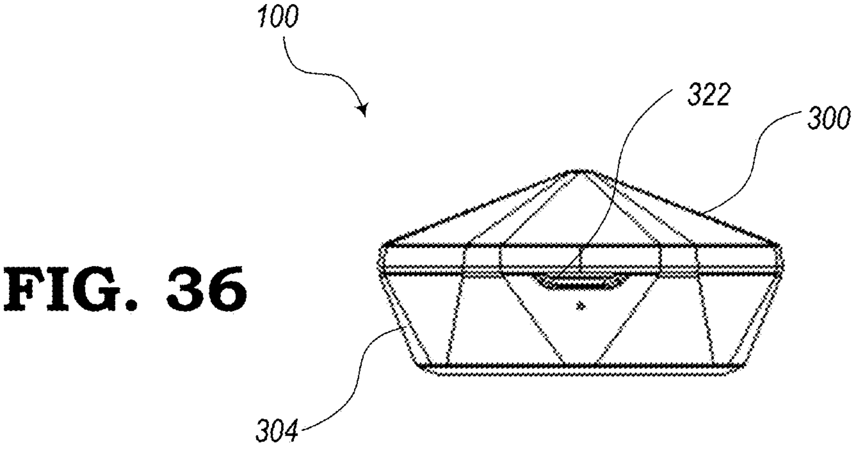
Figure 37:
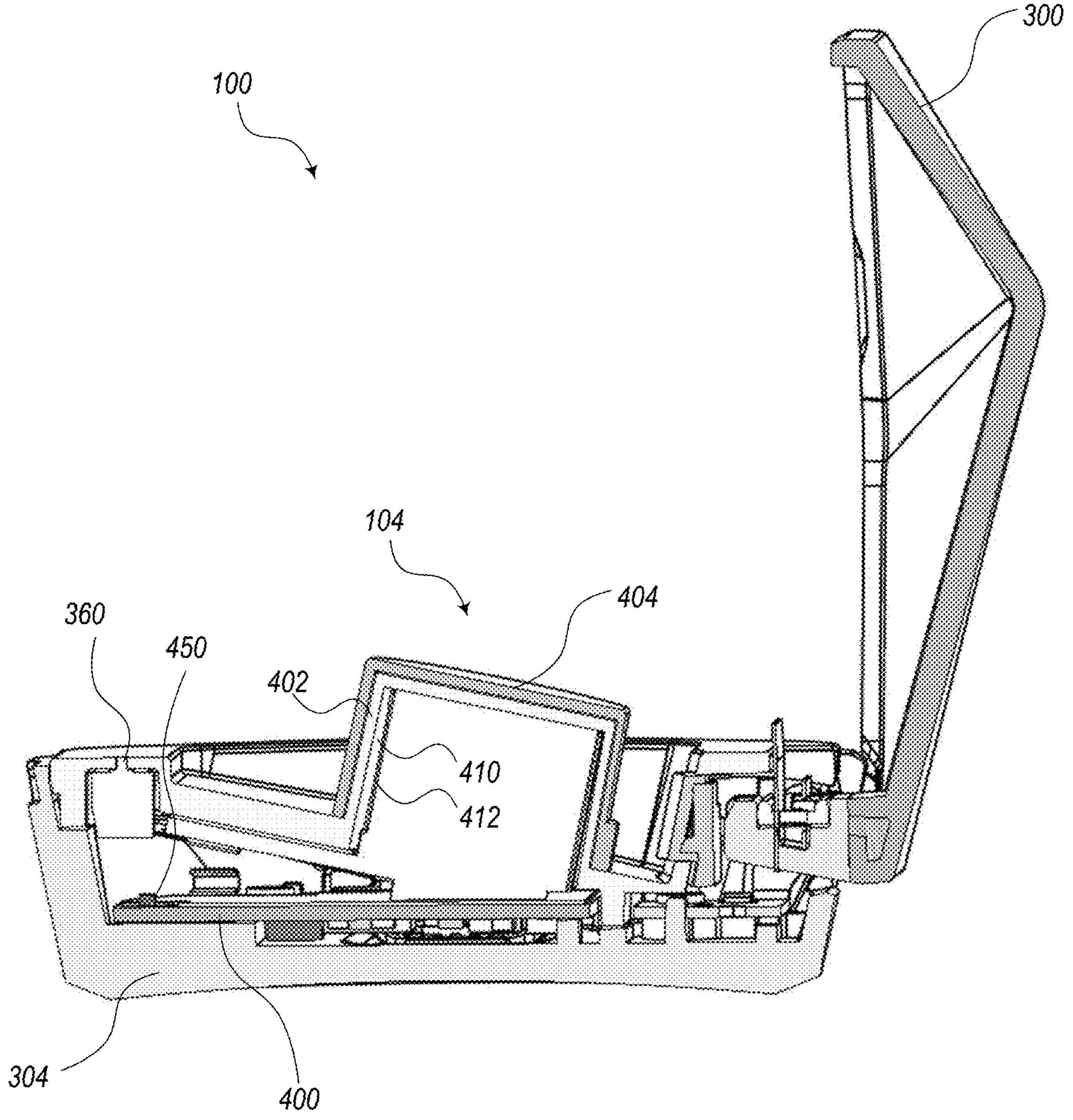
FIG. 37 is a cross-sectional diagram of the charging case illustrating how the various interior components can be positioned, in an embodiment.

FIGS. 34-36 provide various perspective diagrams of the charging case 100 with the front cover 300 closed on the base 304. FIG. 37 is a cross-sectional diagram of the charging case 100 illustrating how the various interior components are position, in an embodiment. The post 104 includes the rubber boot 404 over the middle frame 402 which is over the flex holder 412, where the flex PCB 410 is taped on the flex holder 412 and covered by the middle frame 402. The light pipe 360 is shown relative to an LED 450 on the PCB 400

Advanced Functionality

Note, charging via the charging case 100 is via NFC, namely USB power to the embedded battery 420 and/or direct to the antenna 10. There is no need for a spring connector to contact a terminal on the ring 102.

The PCB 410 supports various functionality associated with the charging case 100 including powering the antenna 10 for charging the ring 102, charging the battery 420, pairing with the ring 102, communicating with the ring 102 and/or a smart phone having an app for the ring 102, and the like.

In an embodiment, the charging case 100 includes an intelligent light sensor, e.g., on the PCB 410, that will control an LED connected to the light pipe 360, e.g., only turn on when it is dark room, and/or when the user opens the front cover 300. Also, e.g., if the room is full of light, the charging case 100 light should not lid up even when the user opens the front cover 300. In some embodiments, the LED can be used to denote charging status, e.g., to note fully charged, charging in progress, and the like, or some combination thereof. In some embodiments, the LED can be particular or different colors to indicate, but not be limited to, a charge progress, duration of charge, amount of charge remaining, and the like, or some combination thereof.

In some embodiments, the charging case 100 includes an ambient temperature sensor, e.g., on the PCB 410. The ambient temperature sensor can be used to monitor ambient temperature in a room. This monitored temperature can be used to correlate data between the charging case 100 and the ring 102 on a finger. This can improve sleep detection, i.e., determining when a wearer is asleep versus awake. For example, the data (e.g., monitored light, monitored temperature, etc.) can be correlated from the room (where the charging case 100 is, most likely bedrooms) to the sleep quality data obtained from the ring 102. For example, a poorly lit room leading to falls, too bright rooms leading to poor sleep, etc. The ambient temperature impacts how restful and quickly people get to sleep. But if ambient temp is read from the ring 102, we will get the bed temperature and not ambient temperature. Also, a delta between the ring 102 and the charging case 100 in temperature can be used to detect body temperature.

CONCLUSION

It will be appreciated that some embodiments described herein may include one or more generic or specialized processors ("one or more processors") such as microprocessors; central processing units (CPUs); digital signal processors (DSPs): customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a read-only memory (ROM), a programmable read-only memory (PROM), an erasable programmable read-only memory (EPROM), an electrically erasable programmable read-only memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. The foregoing sections include headers for various embodiments and those skilled in the art will appreciate these various embodiments may be used in combination with one another as well as individually.

What is claimed is:

1. A charging case comprising:
- a base;
- a front cover connected to the base and configured to seal an interior of the charging case;
- a post on the base and in the interior, wherein the base is dimensioned to receive a wearable device;
- an antenna disposed within the post;
- circuitry connected to the antenna and to a charging port located on the base; and
- an ambient temperature sensor in the circuitry.

2. The charging case of claim 1, wherein the antenna supports both Near Field Communication (NFC) for charging the wearable device and short-range wireless communication for communicating with the wearable device.

3. The charging case of claim 1, wherein the antenna supports Near Field Communication (NFC) for charging the wearable device.

4. The charging case of claim 1, wherein the wearable device is a smart ring.

5. The charging case of claim 4, further comprising:
- a wedge disposed between the smart ring and a wall facing the post, wherein the wedge is dimensioned based on a size of the smart ring.

6. The charging case of claim 4, wherein the post is at an angle on the base, with the angle directed towards the front cover when open.

7. The charging case of claim 1, wherein each of the base and the front cover lacks an externally accessible user-actuated button, switch, or touch display.

8. The charging case of claim 1, wherein the wearable device is configured to pair with the charging case based on any of detected motion of the wearable device, tapping of the wearable device, and tapping of the charging case.

9. The charging case of claim 1, wherein the charging port utilizes Universal Serial Bus (USB).

10. The charging case of claim 1, further comprising:
- an embedded battery in the base, connected to the circuitry and the charging port.

11. The charging case of claim 1, further comprising:
- a light pipe on the base and connected to a light emitting diode (LED) on the circuitry.

12. The charging case of claim 11, further comprising:
- a light sensor in the circuitry, wherein the light sensor is configured to monitor light in a room where the charging case is located.

13. The charging case of claim 11, wherein the circuitry is configured to illuminate the LED based on light in a room where the charging case is located.

14. The charging case of claim 1, wherein the circuitry is configured to:
- monitor ambient temperature in a room where the charging case is located, and
- utilize the monitored ambient temperature for one of a plurality of functions.

15. The charging case of claim 14, wherein the plurality of functions comprise monitoring for falls with the wearable device, monitoring sleep of a user wearing the wearable device, and monitoring body temperature of the user.

16. The charging case of claim 1, further comprising:
- a light pipe on the base and connected to a light emitting diode (LED) on the circuitry; and
- a light sensor in the circuitry, wherein the light sensor is configured to monitor light in a room where the charging case is located.

17. The charging case of claim 16, wherein the circuitry is configured to provide data from any of the ambient temperature sensor and the light sensor for correlation with data from the wearable device.

18. The charging case of claim 1, further comprising:
- a seal between the front cover and the base for environmentally sealing the interior.

19. The charging case of claim 1, further comprising:
- a rubber boot configured over the post, wherein the rubber boot is dimensioned based on a size of the wearable device.

* * * * *